US011172624B2

(12) United States Patent
Lysaa

(10) Patent No.: US 11,172,624 B2
(45) Date of Patent: Nov. 16, 2021

(54) HIGH-DENSITY PLANT CULTIVATION SYSTEMS AND RELATED APPARATUSES AND METHODS

(71) Applicant: LYSAA HOLDING AS, Oslo (NO)

(72) Inventor: Per Aage Lysaa, Oslo (NO)

(73) Assignee: LYSAA HOLDING AS, Oslo (NO)

( * ) Notice: Subject to any disclaimer, the term of this patent is extended or adjusted under 35 U.S.C. 154(b) by 230 days.

(21) Appl. No.: 16/264,960

(22) Filed: Feb. 1, 2019

(65) Prior Publication Data

US 2019/0230876 A1     Aug. 1, 2019

Related U.S. Application Data

(60) Provisional application No. 62/625,014, filed on Feb. 1, 2018.

(51) Int. Cl.
| | |
|---|---|
| *A01G 27/00* | (2006.01) |
| *A01G 7/02* | (2006.01) |
| *A01G 9/02* | (2018.01) |
| *A01G 31/06* | (2006.01) |
| *A01G 31/04* | (2006.01) |

(52) U.S. Cl.
CPC .............. *A01G 27/005* (2013.01); *A01G 7/02* (2013.01); *A01G 9/023* (2013.01); *A01G 31/042* (2013.01); *A01G 31/06* (2013.01)

(58) Field of Classification Search
CPC ...... A01G 31/00; A01G 31/04; A01G 31/042; A01G 31/06; A01G 7/02; A01G 27/005
See application file for complete search history.

(56) References Cited

U.S. PATENT DOCUMENTS

| | | | |
|---|---|---|---|
| 6,095,347 A | 8/2000 | Mauro-Vetter | |
| 2016/0235023 A1* | 8/2016 | Thoma | A01G 31/02 |
| 2018/0042192 A1* | 2/2018 | Volpe | A01G 31/02 |

FOREIGN PATENT DOCUMENTS

| | | | | |
|---|---|---|---|---|
| DE | 4004154 A1 | 8/1991 | | |
| DE | 102011050545 B3 * | 11/2012 | ............ | A01G 31/06 |
| DE | 102011050545 B3 | 11/2012 | | |
| GB | 2550189 A | 11/2017 | | |

OTHER PUBLICATIONS

International Search Report with Written Opinion for related Application No. PCT/IB2019/050828 dated Jul. 10, 2019 (22 Pages).

* cited by examiner

*Primary Examiner* — Timothy D Collins
*Assistant Examiner* — Brittany A Lowery
(74) *Attorney, Agent, or Firm* — Michael Best & Friedrich LLP

(57) ABSTRACT

A gravity-driven plant cultivation system includes: (a) a frame; (b) a plurality of vertically stacked conveyor assemblies mounted to the frame. Each conveyor assembly includes at least one gravity conveyor extending along a conveyor axis. The conveyor axis slopes downwards relative to a horizontal plane from a frame upstream end to a frame downstream end of the frame. The system further includes (c) a plurality of plant cultivation trays rollingly supported on each gravity conveyor and urged to translate along a respective conveyor axis toward the frame downstream end via gravitational force.

18 Claims, 17 Drawing Sheets

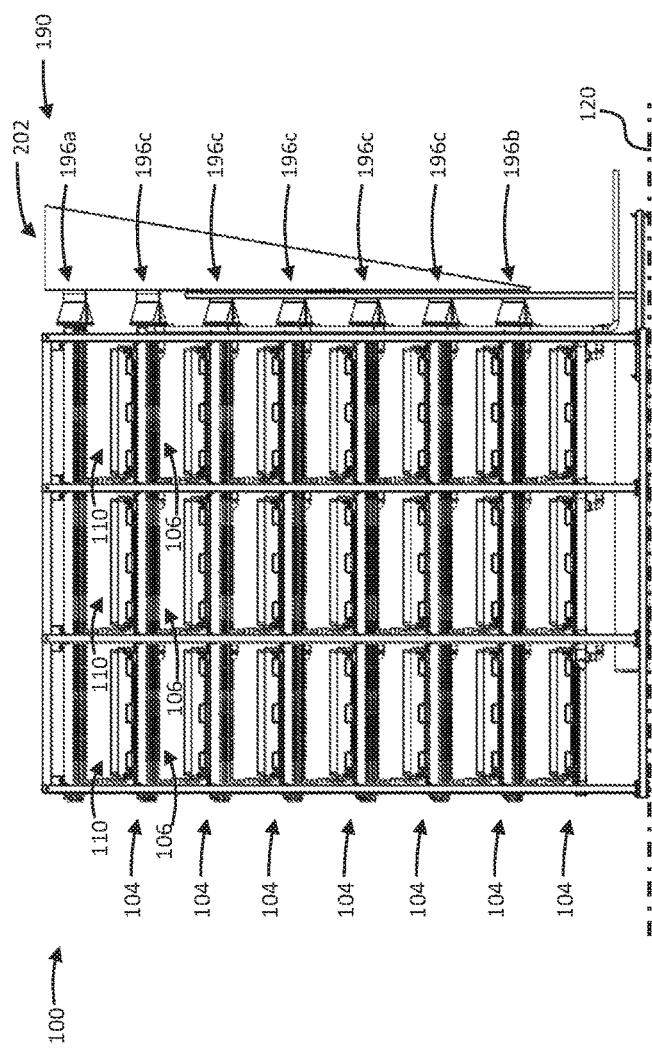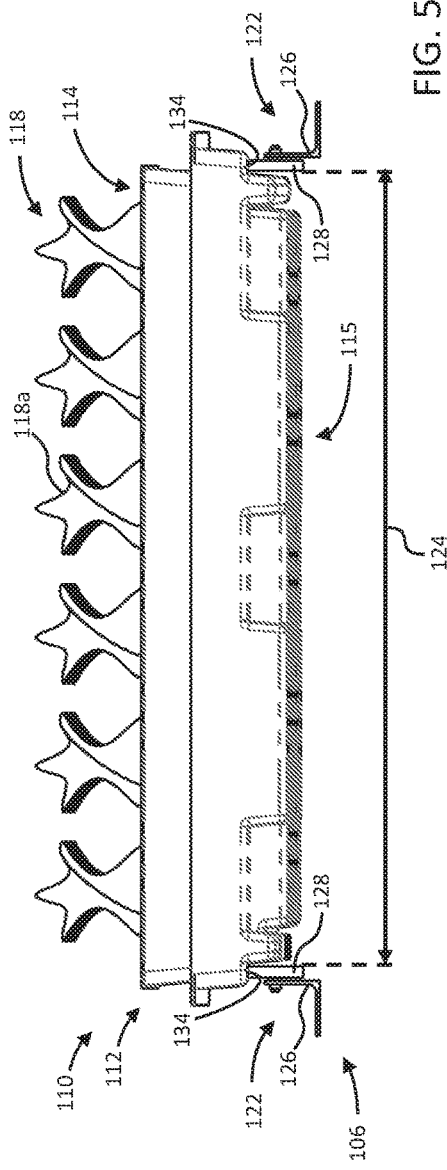
FIG. 4
FIG. 5

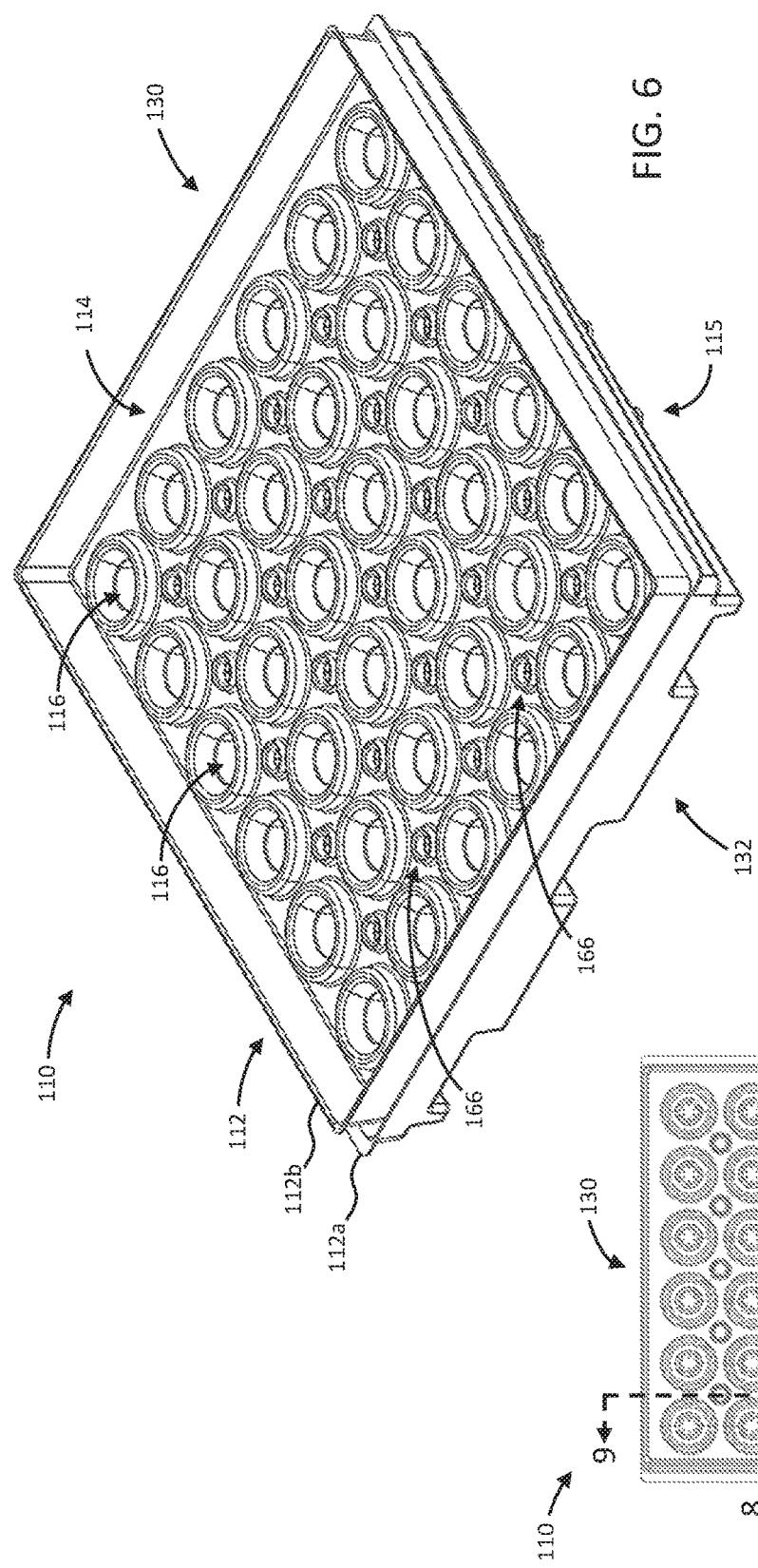
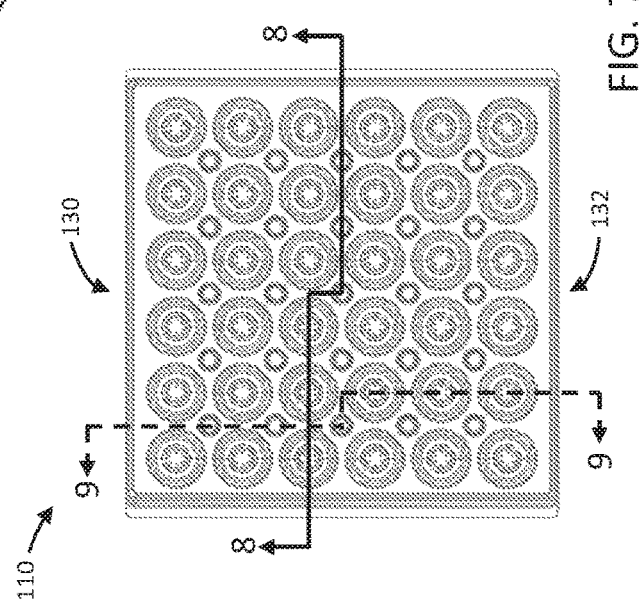

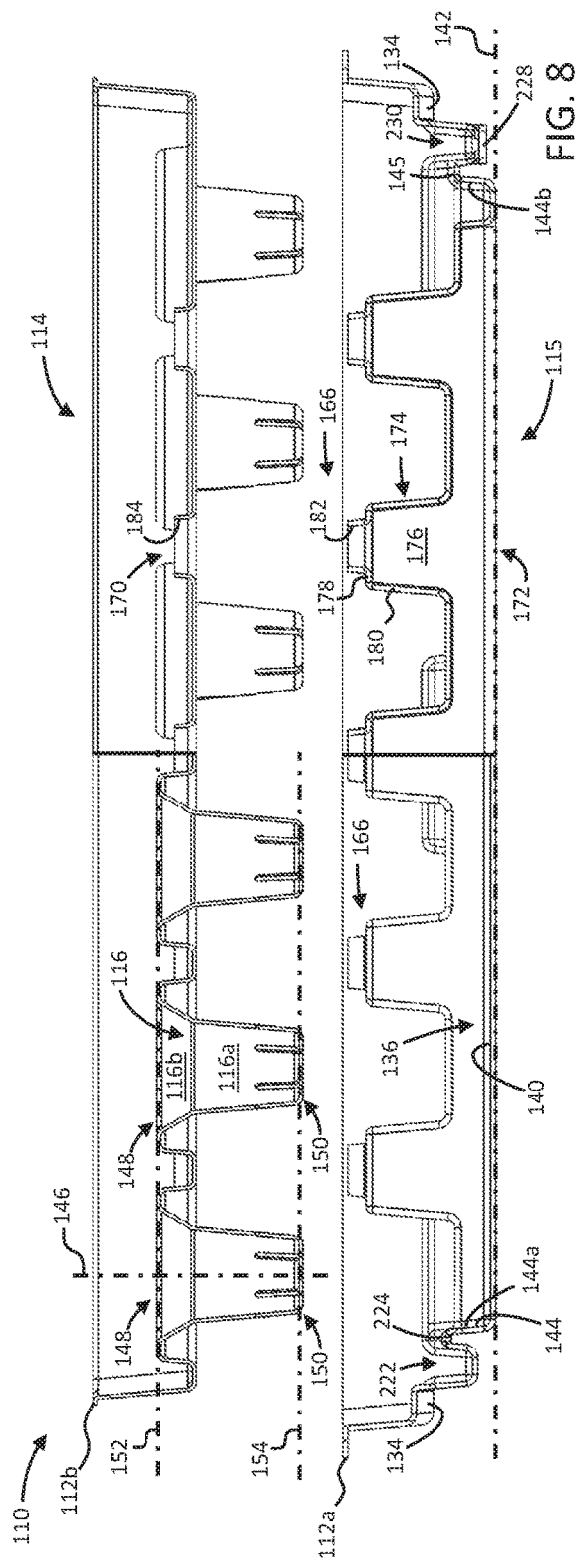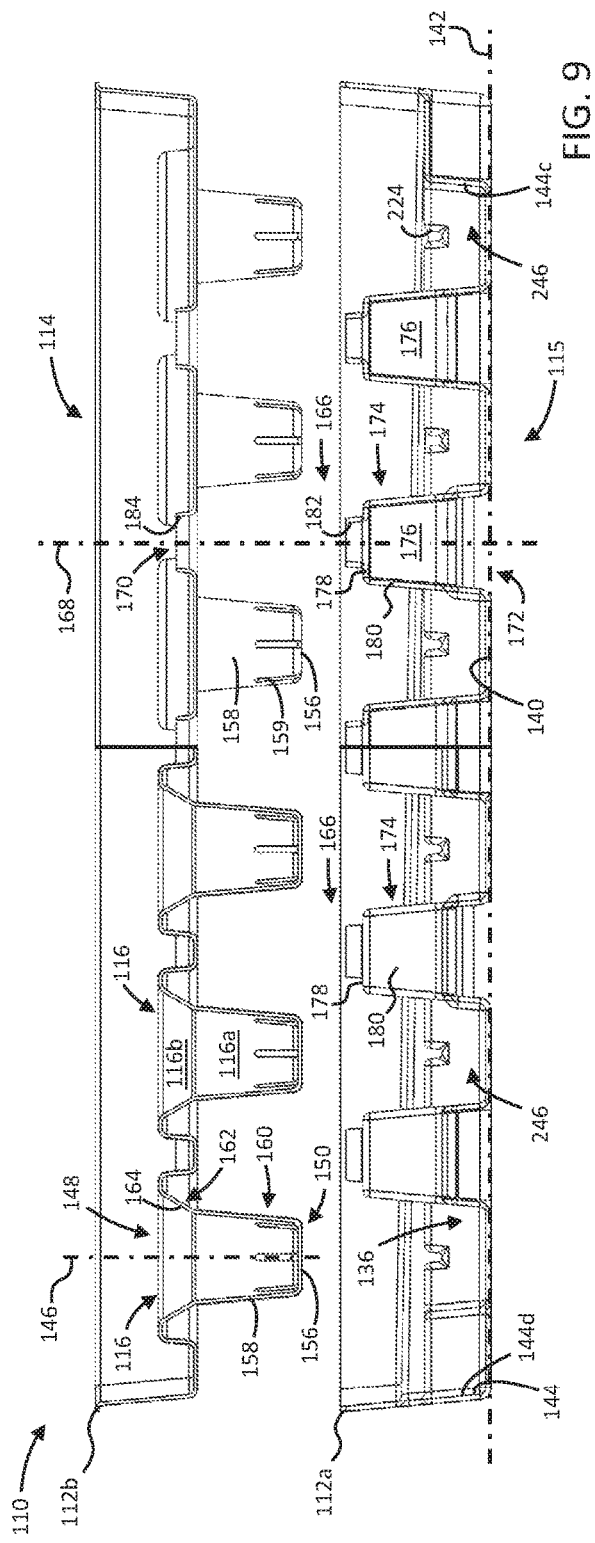

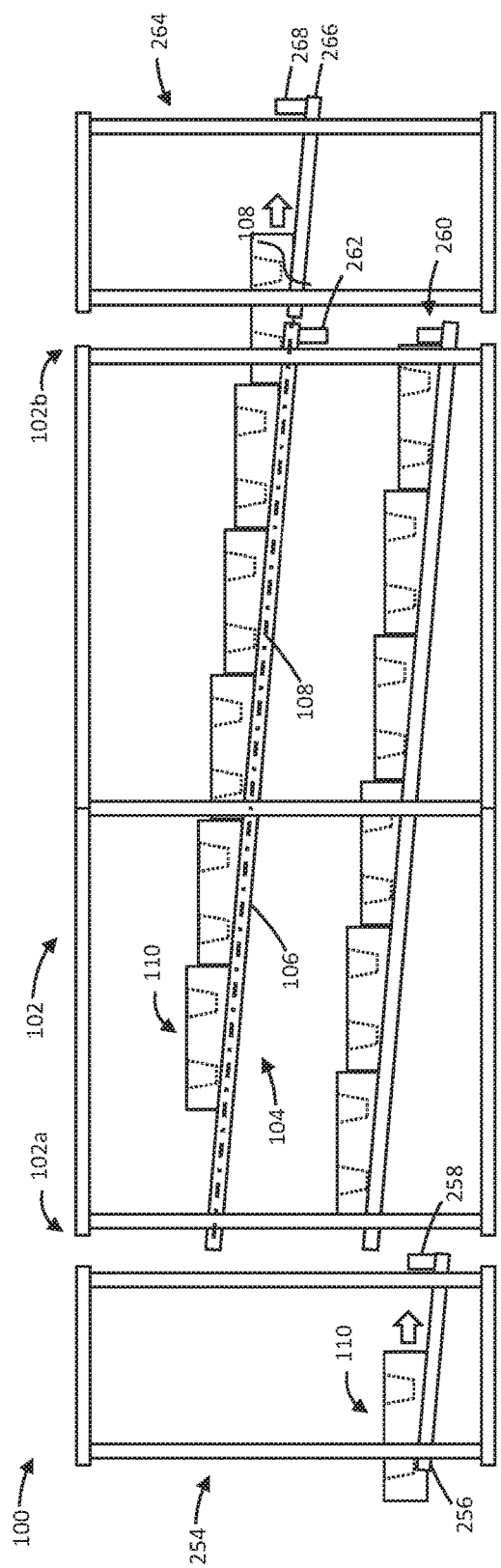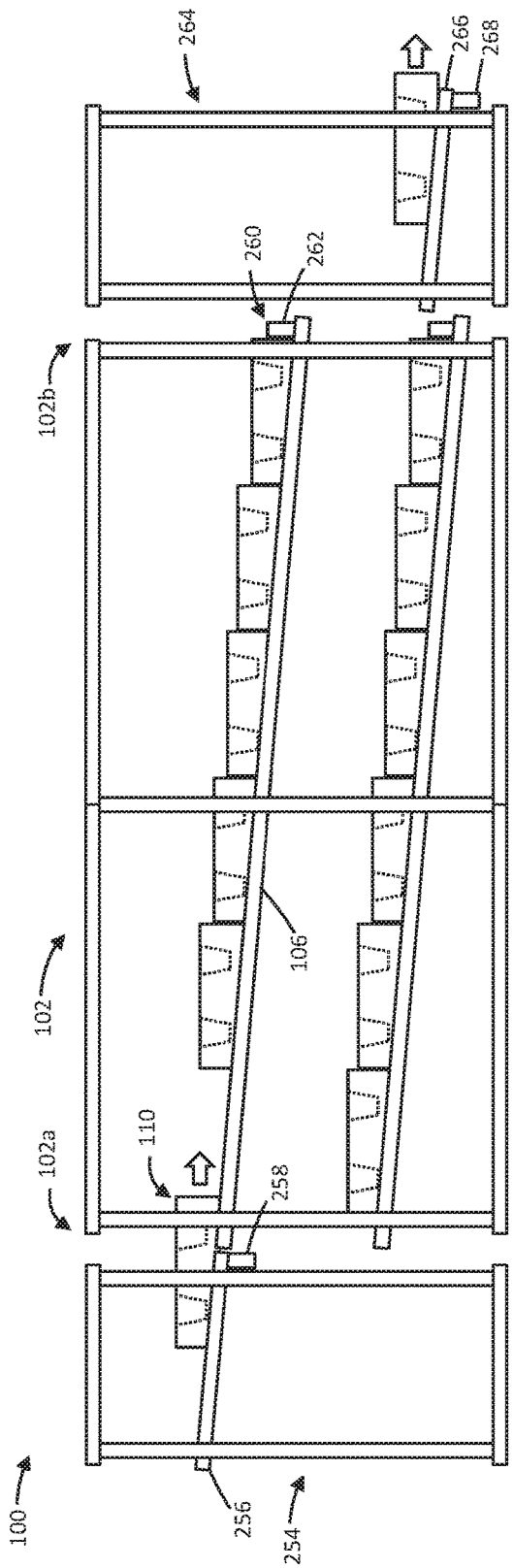

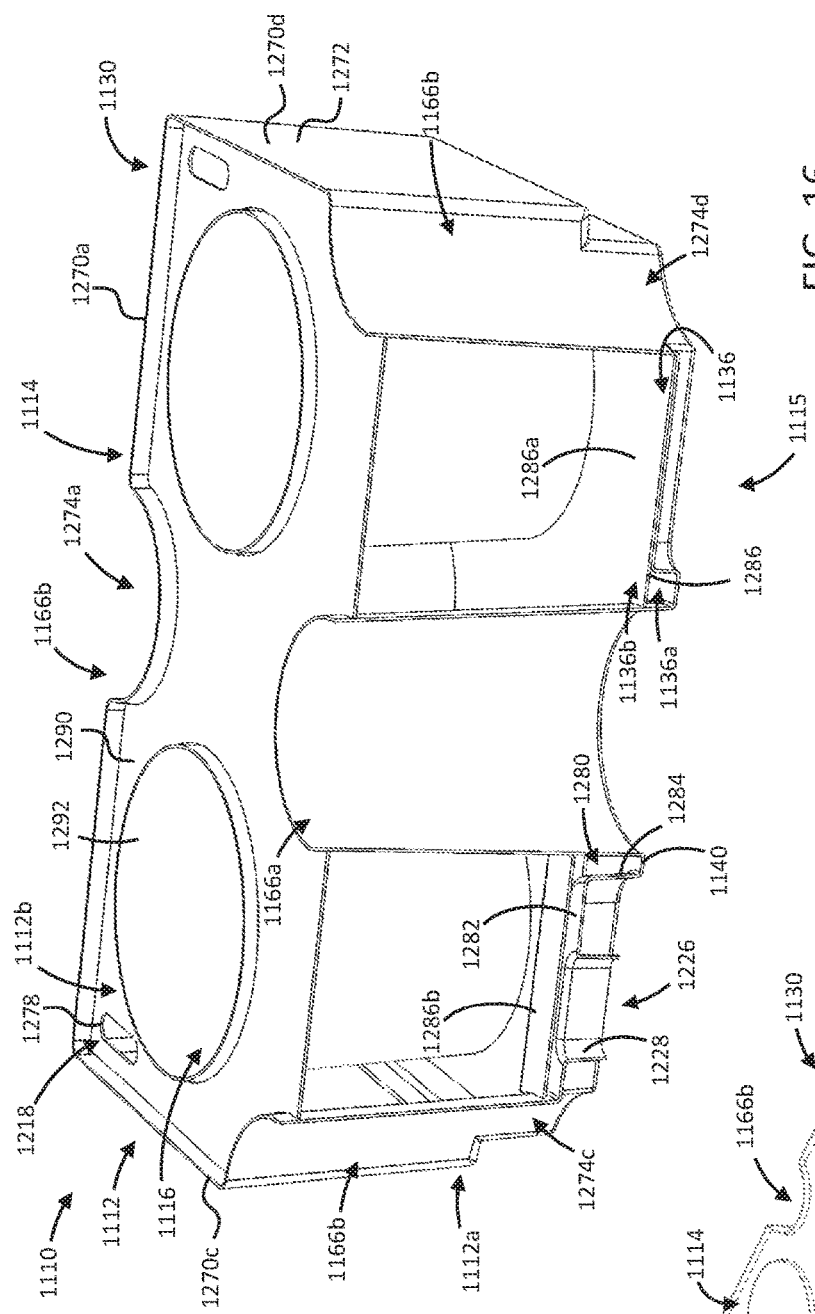
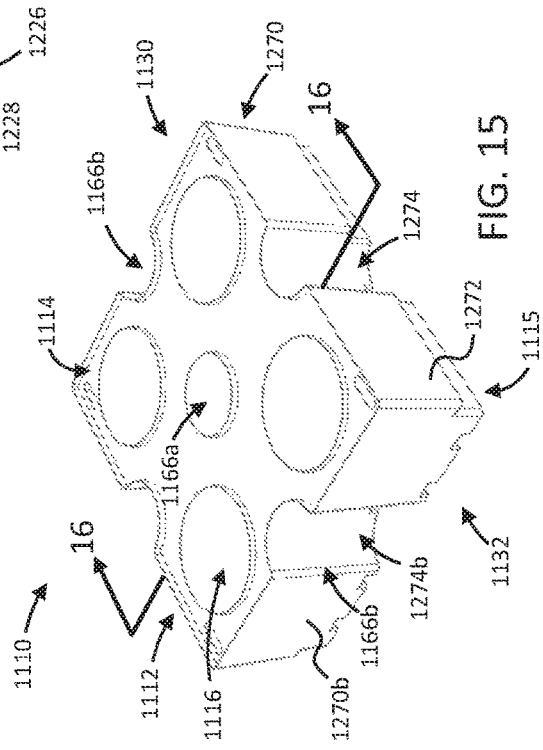

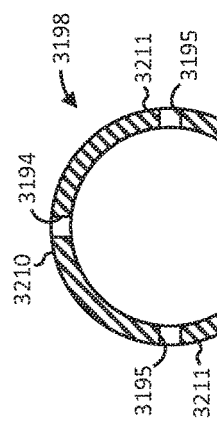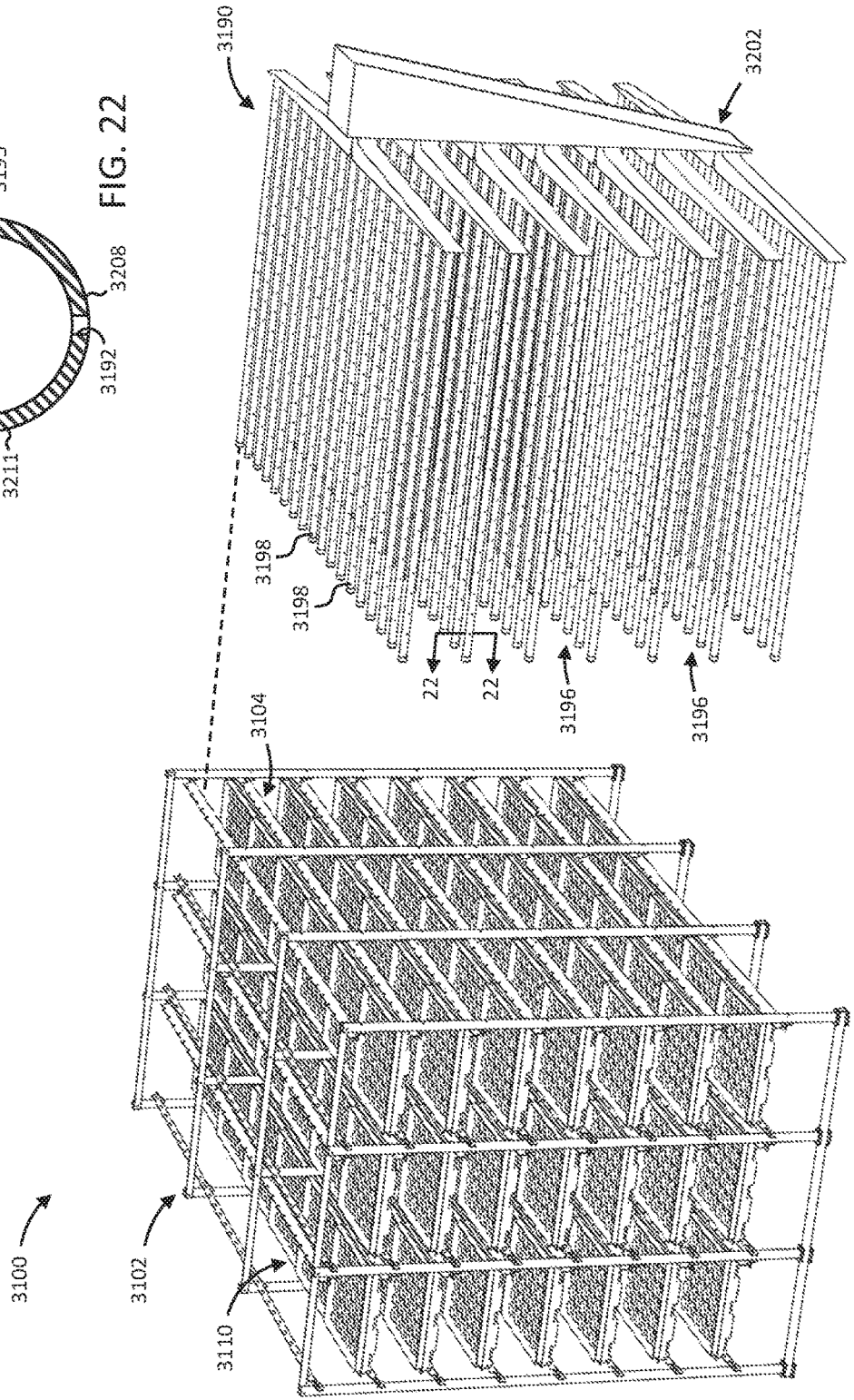

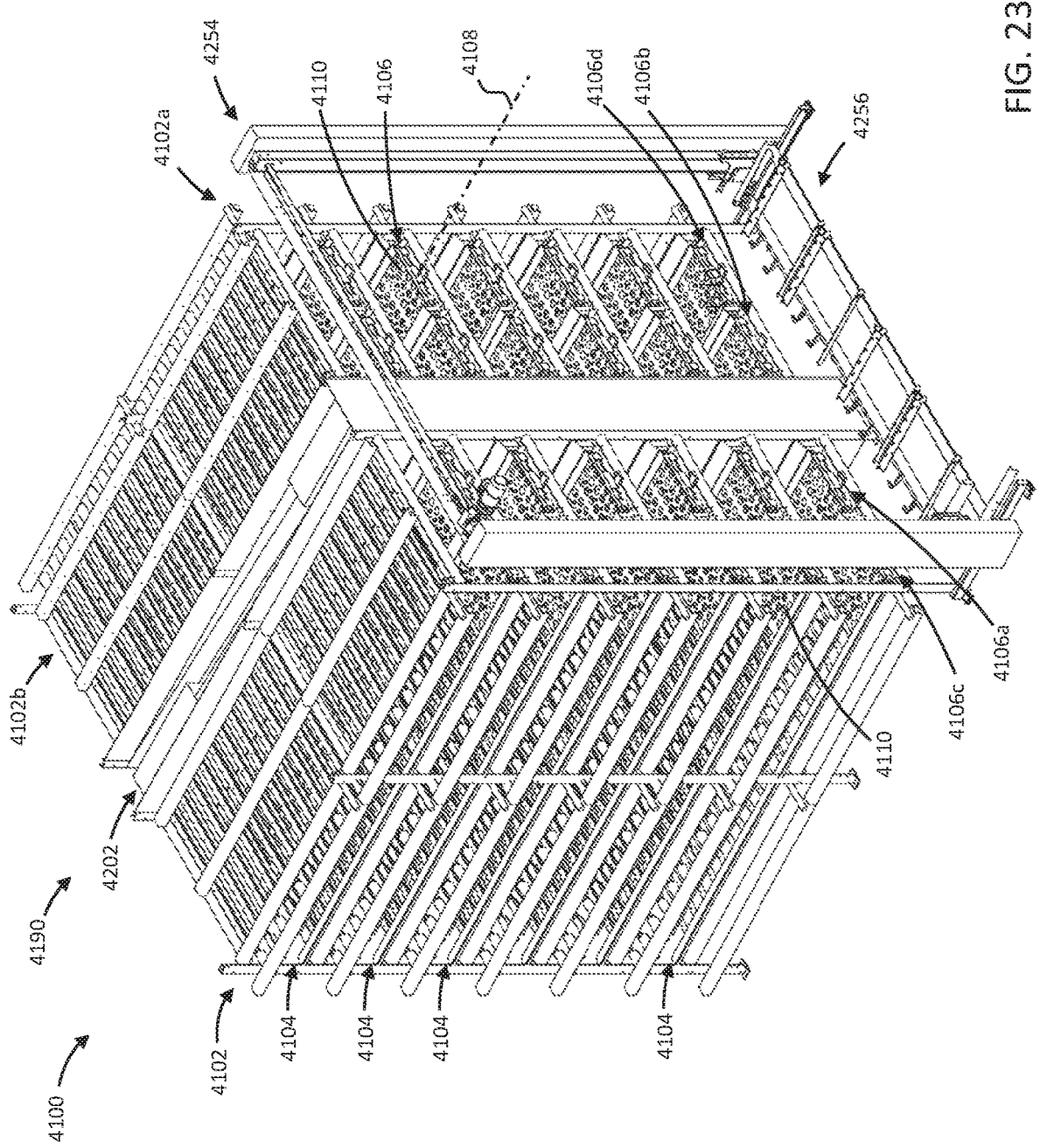

HIGH-DENSITY PLANT CULTIVATION SYSTEMS AND RELATED APPARATUSES AND METHODS

CROSS-REFERENCE TO RELATED APPLICATIONS

This application claims the benefit of U.S. Provisional Application No. 62/625,014, filed on Feb. 1, 2018, the entirety of which is incorporated herein by reference.

FIELD

The disclosure relates generally to plant cultivation. More specifically, the disclosure relates to high-density, vertically-stacked plant cultivation systems and related apparatuses and methods.

BACKGROUND

U.S. Pat. App. Pub. No. 2017/0027112 (Vail et al.) discloses an indoor farming module system. The indoor farming module system may comprise a housing. Additionally, the indoor farming module system may comprise a plurality of indoor farming module components within the housing, the plurality of indoor farming module components comprising a high-density racking system having a plurality of vertical levels within the housing, wherein a vertical distance between two adjacent vertical levels is not more than 11 inches; an airflow management lighting system, wherein the airflow management lighting system provides airflow and lighting to each level of the plurality of vertical levels; an irrigation system; and a recirculation system.

U.S. Pat. No. 4,854,075 (Greiling) discloses a plant tray having a plurality of cups in a flat sheet of moldable material wherein the cups are in parallel rows with at least some of the rows having spaces between some of the cups for air openings in the flat sheet to supply air to the foliage of plants growing in the cups. The cups in adjacent rows may be offset and have a variable width shape such as a hexagon to provide a maximum number of cups in the available space and which are located close to the air openings. The cups of hexagonal cross section also have corners for directing the root growth of the plants. The sidewalls of adjacent cups surrounding the air openings form funnels for improved air drainage.

U.S. Pat. No. 4,495,725 (Talbott) discloses an apparatus for growing plants having a floor with a plurality of raised projections defining trough regions therebetween and being adapted to hold plant watering fluid at a level relative to the upper periphery of the projections. An insert for the pan is also provided, having a plurality of spaced, downwardly extending cells, each cell including a bottom defining an opening. The insert is shiftable between a first position and a second position. The first position is one in which the bottoms are disposed in the trough regions below the level of the watering fluid so that the fluid can enter the openings. In the second position, at least some of the bottoms rest upon the projections so that the openings are less than fully obstructed by the projections and so that fluid within the cells can drain therefrom.

SUMMARY

The following summary is intended to introduce the reader to various aspects of the applicant's teaching, but not to define any invention.

According to some aspects, a gravity-driven plant cultivation system includes: (a) a frame having a frame upstream end and a frame downstream end spaced horizontally apart from the frame upstream end; and (b) a plurality of vertically stacked conveyor assemblies mounted to the frame. Each conveyor assembly includes at least one gravity conveyor extending between the frame upstream end and the frame downstream end along a conveyor axis. The conveyor axis slopes downwards relative to a horizontal plane from the frame upstream end to the frame downstream end. The system further includes (c) a plurality of plant cultivation trays rollingly supported on each gravity conveyor and urged to translate along a respective conveyor axis toward the frame downstream end via gravitational force. Each tray includes: (i) a tray body having a tray top and a tray bottom vertically opposite the tray top; (ii) a plurality of plant cavities in the tray body and open to the tray top, the plant cavities for holding plants; and (iii) a nutrient chamber internal the tray body and in fluid communication with the plant cavities, the nutrient chamber for holding plant nutrient solution.

In some examples, each gravity conveyor includes a pair of supports spaced laterally apart from one another by a conveyor opening. Each tray support includes a rail extending between the frame downstream end and the frame upstream end generally parallel with a respective conveyor axis, and a plurality of wheels rotatably mounted to the rail and spaced apart from one another along the conveyor axis. The wheels of the pair of supports engage laterally spaced apart tray underside surfaces of the plant cultivation trays supported on the conveyor. Each tray underside surface slopes downwardly relative to the horizontal plane generally parallel with the conveyor axis.

In some examples, the tray body includes a nutrient chamber bottom wall lying in a bottom wall plane and a nutrient chamber sidewall extending upwardly from a periphery of the nutrient chamber bottom wall. The nutrient chamber bottom wall and the nutrient chamber sidewall enclose the nutrient chamber. The nutrient chamber bottom wall is generally parallel with the horizontal plane for maintaining a generally constant depth of the plant nutrient solution across the nutrient chamber bottom wall.

In some examples, the nutrient chamber is laterally intermediate the pair of tray supports. In some examples, the nutrient chamber extends into the conveyor opening.

In some examples, each tray includes at least one tray vent passing through the tray body. The tray vent extends along a vertical vent axis normal to the horizontal plane between a vent top end open to the tray top and a vent bottom end open to the tray bottom. The tray vent is for passing air through the tray body to facilitate delivery of air to the plants from below. In some examples, the tray vent passes through the nutrient chamber.

In some examples, the system further includes an air delivery ductwork for delivering air to the plants. The air delivery ductwork includes a plurality of first ports above each plant cultivation tray for discharging air from the air delivery ductwork downwardly to deliver air to the plants from above, and a plurality second ports below each plant cultivation tray for discharging air from the air delivery ductwork upwardly to deliver air to the plants from below via the tray vents.

According to some aspects, a plant cultivation tray for a gravity-driven plant cultivation system includes: (a) a tray body having a tray top, a tray bottom vertically opposite the tray top, a tray front, and a tray rear axially opposite the tray front. The tray body includes: (i) a pair of laterally spaced apart tray underside surfaces for engagement with wheels of a gravity conveyor to rollingly support the plant cultivation tray thereon. Each underside surface slopes downwards relative to a horizontal plane from the tray rear to the tray front when the tray is supported on the conveyor. The tray body further includes (ii) a nutrient chamber bottom wall lying in a bottom wall plane; and (iii) a nutrient chamber sidewall extending upwardly from a periphery of the nutrient chamber bottom wall. The nutrient chamber bottom wall and the nutrient chamber sidewall enclose a nutrient chamber internal the tray body for holding plant nutrient solution. The nutrient chamber bottom wall is generally parallel with the horizontal plane when the tray is supported on the conveyor for maintaining a generally constant depth of the plant nutrient solution across the nutrient chamber bottom wall. The plant cultivation tray further includes (b) a plurality of plant cavities in the tray body for holding plants. The plant cavities are open to the tray top and in fluid communication with the nutrient chamber for providing the plant nutrient solution to the plants.

In some examples, the nutrient chamber bottom wall is laterally intermediate and at an elevation below the underside surfaces.

In some examples, the tray includes at least one tray vent passing through the tray body. The tray vent extends along a vertical vent axis normal to the horizontal plane between a vent top end open to the tray top and a vent bottom end open to the tray bottom. The tray vent is for passing air through the tray body to facilitate delivery of air to the plants from below. In some examples, the tray vent passes through the nutrient chamber.

In some examples, each plant cavity extends along a vertical cavity axis normal to the horizontal plane between a cavity top end open to the tray top and a cavity bottom end below the cavity top end. In some examples, the cavity bottom end of each plant cavity lies in a common cavity bottom plane, the cavity bottom plane generally parallel with the horizontal plane when the tray is supported on the gravity conveyor. In some examples, the cavity top end of each plant cavity lies in a common cavity top plane, the cavity top plane generally parallel with the horizontal plane when the tray is supported on the gravity conveyor.

According to some aspects, a method of operating a high-density plant cultivation system includes: (a) rollingly supporting a plurality of plant cultivation trays holding plants on a gravity conveyor, the gravity conveyor extending along a conveyor axis between a frame upstream end and a frame downstream end, the conveyor axis sloping downwardly relative to a horizontal plane from the frame upstream end to the frame downstream end; (b) delivering air, plant nutrient solution, and light to the plants to facilitate plant growth; and (c) rolling the plant cultivation trays supported on the gravity conveyor along the conveyor axis toward the frame downstream end via gravitational force.

In some examples, the method further includes: supplying the plant nutrient solution to a nutrient chamber internal each tray, the nutrient chamber in fluid communication with the plants and enclosed from below by a nutrient chamber bottom wall of the tray, the nutrient chamber bottom wall lying in a bottom wall plane, and during steps (a) to (c), maintaining the bottom wall plane generally parallel with the horizontal plane.

According to some aspects, a plant cultivation system includes: (a) a frame having a frame upstream end and a frame downstream end spaced horizontally apart from the frame upstream end; and (b) a plurality of vertically stacked conveyor assemblies mounted to the frame. Each conveyor assembly includes at least one conveyor extending between the frame upstream end and the frame downstream end along a conveyor axis. The system further includes (c) a plurality of plant cultivation trays supported on each conveyor for translation along a respective conveyor axis toward the frame downstream end. Each plant cultivation tray includes: (i) a tray body having a tray top and a tray bottom vertically opposite the tray top; (ii) a plurality of plant cavities in the tray body and open to the tray top, the plant cavities for holding plants; and (iii) at least one tray vent passing vertically through the tray body, the tray vent open to the tray top and the tray bottom for passing air vertically through the tray body to facilitate delivery of air to the plants from below. The system further includes (d) an air delivery ductwork for delivering air to the plants. The air delivery ductwork includes a plurality of first ports above each plant cultivation tray for discharging air from the air delivery ductwork downwardly to deliver air to the plants from above, and a plurality second ports below each plant cultivation tray for discharging air from the air delivery ductwork upwardly to deliver air to the plants from below via the tray vents.

In some examples, each tray vent extends between a vent top end open to the tray top and a vent bottom end open to the tray bottom, and the vent bottom end overlies at least one of the second ports for receiving air discharged from the at least one of the second ports.

In some examples, each plant cultivation tray includes a nutrient chamber internal the tray body and in fluid communication with the plant cavities. The nutrient chamber is for holding plant nutrient solution. In some examples, the tray vent passes vertically through the nutrient chamber.

In some examples, each tray includes a tray sidewall extending between the tray top and the tray bottom, the tray sidewall having a horizontally outwardly directed sidewall outer surface and at least one vent recess extending horizontally inward of the sidewall outer surface and open to the tray top and the tray bottom. In some examples, the tray vent comprises the vent recess.

In some examples, each conveyor includes a pair of supports spaced laterally apart from one another by a conveyor opening and extending between the frame upstream end and the frame downstream end along the conveyor axis. The supports engage laterally spaced apart tray underside surfaces of the plant cultivation trays supported on the conveyor. The tray vents of the plant cultivation trays supported on the conveyor are laterally intermediate the pair of tray supports and overlying the conveyor opening.

In some examples, the air delivery ductwork includes a plurality of duct assemblies for conducting air to the first and second ports. The duct assemblies are spaced vertically apart from one another, and the conveyor assemblies and the duct assemblies are vertically interposed between one another.

In some examples, the air delivery ductwork includes a duct header in fluid communication with each duct assembly for conducting air thereto.

In some examples, the duct assemblies include an upper duct assembly above the conveyor assemblies. The upper duct assembly includes at least one upper duct having an upper duct bottom wall facing the conveyor assemblies and a set of the first ports in the upper duct bottom wall for discharging air downwardly from the upper duct.

In some examples, the duct assemblies include a lower duct assembly below the conveyor assemblies. The lower duct assembly includes at least one lower duct having a lower duct top wall facing the conveyor assemblies and a set of the second ports in the lower duct top wall for discharging air upwardly from the lower duct.

In some examples, the duct assemblies include at least one intermediate duct assembly vertically intermediate an upper one of the conveyor assemblies above the intermediate duct assembly and a lower one of the conveyor assemblies below the intermediate duct assembly. The intermediate duct assembly includes at least one intermediate duct having: an intermediate duct bottom wall facing the lower one of the conveyor assemblies, a set of the first ports in the intermediate duct bottom wall for discharging air downwardly from the intermediate duct, an intermediate duct top wall opposite the intermediate duct bottom wall and facing the upper one of the conveyor assemblies, and a set of the second ports in the intermediate duct top wall for discharging air upwardly from the intermediate duct.

In some examples, the conveyor axis slopes downwards relative to a horizontal plane from the frame upstream end to the frame downstream end for urging translation of the plant cultivation trays along the conveyor axis toward the frame downstream end via gravitational force. In some examples, each conveyor assembly includes a plurality of ducts, with each duct extending laterally across the conveyor assemblies perpendicular to the conveyor axis. The ducts of each duct assembly are spaced apart from one another along a conveyor assembly axis. The conveyor assembly axis is parallel with the conveyor axis.

In some examples, each conveyor assembly includes a plurality of the conveyors mounted at a generally common elevation and arranged in side-by-side lanes, the conveyors of each conveyor assembly including a first conveyor and a second conveyor spaced laterally apart from and extending parallel with the first conveyor. In some examples, the air delivery ductwork includes one or more duct headers laterally intermediate the first and second conveyors, a plurality of first duct assemblies extending laterally from a first side of the duct headers for delivering air to plants held in trays supported on each first conveyor, and a plurality of second duct assemblies extending laterally from a second side of the duct headers opposite the first side for delivering air to plants held in trays supported on each second conveyor. In some examples, the one or more duct headers include a first duct header in fluid communication with the first duct assemblies for conducting air thereto, and a second duct header in fluid communication with the second duct assemblies for conducting air thereto. In some examples, the first duct header is spaced axially apart from the second duct header. In some examples, each duct header is oriented generally vertically, and each duct assembly is oriented generally horizontally.

According to some aspects, a plant cultivation tray includes: (a) a tray body having a tray top and a tray bottom opposite the tray top; (b) a nutrient chamber internal the tray body for holding plant nutrient solution; (c) a plurality of plant cavities in the tray body for holding plants, each plant cavity open to the tray top and in fluid communication with the nutrient chamber for providing the plant nutrient solution to the plants; and (d) at least one tray vent passing vertically through the tray body and the nutrient chamber, the tray vent open to the tray top and the tray bottom for passing air vertically through the tray body to facilitate delivery of air to the plants from below.

In some examples, the tray body includes a tray lower portion and a tray upper portion removably nested in the tray lower portion. The nutrient chamber is in the tray lower portion, the plant cavities are in the tray upper portion, and the tray vent passes through the tray lower portion and the tray upper portion.

In some examples, the tray body includes a nutrient chamber bottom wall and a nutrient chamber sidewall extending upwardly from a periphery of the nutrient chamber bottom wall. The nutrient chamber bottom wall and the nutrient chamber sidewall enclose the nutrient chamber.

In some examples, the tray vent includes a vent projection extending upwardly from the nutrient chamber bottom wall and through the nutrient chamber. The vent projection includes a hollow vent interior in fluid isolation of the nutrient chamber, and a projection port above the nutrient chamber and providing fluid communication between the vent interior and the tray top. In some examples, the vent projection includes a projection top wall above the nutrient chamber and a projection sidewall extending between the chamber bottom wall and the projection top wall. The projection sidewall horizontally encloses the vent interior and the projection port is in the projection top wall.

According to some aspects, a method of cultivating plants in a high-density plant cultivation system includes: (a) supporting a plurality of plant cultivation trays on a conveyor assembly, each plant cultivation tray including a plurality of plant cavities holding plants, the plant cavities open to a tray top of the tray; (b) supplying plant nutrient solution to a nutrient chamber in each plant cultivation tray, the nutrient chamber in fluid communication with the plant cavities for providing the plant nutrient solution to the plants; and (c) discharging air upwardly from a plurality of ports in a duct and conducting the air vertically through the tray and to the plants from below via tray vents passing vertically through each nutrient chamber.

BRIEF DESCRIPTION OF THE DRAWINGS

The drawings included herewith are for illustrating various examples of apparatuses and methods of the present specification and are not intended to limit the scope of what is taught in any way. In the drawings:

FIG. 4 is a rear elevation view of the system of FIG. 1;

FIG. 5 is a schematic rear view of a portion of the system of FIG. 1, showing a plant cultivation tray supported on a conveyor of the system of FIG. 1;

FIG. 6 is a perspective view of a plant cultivation tray of the system of FIG. 1;

FIG. 7 is a top view of the tray of FIG. 6;

FIG. 8 is a cross-sectional exploded view of the tray of FIG. 6 taken along line 8-8 of FIG. 7;

FIG. 9 is a cross-sectional exploded view of the tray of FIG. 6 taken along line 9-9 of FIG. 7;

FIG. 14A is a schematic side elevation view of the system of FIG. 1, with an optional tray loader and an optional tray extractor shown in respective first configurations;

FIG. 14B is a schematic side elevation view like that of FIG. 14A, but showing the tray loader and the tray extractor in respective second configurations;

FIG. 15 is a top perspective view of another example plant cultivation tray for a system like that of FIG. 1;

FIG. 16 is a perspective cross-sectional view of the tray of FIG. 15, taken along line 16-16 of FIG. 15;

FIG. 21A is a partially exploded view of the system of FIG. 21;

FIG. 22 is a cross-sectional view of a duct portion of the system of FIG. 21, taken along line 22-22 of FIG. 21A;

FIG. 23 is a perspective view of another example plant cultivation system; and

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors, or owners do not intend to abandon, disclaim, or dedicate to the public any such invention by its disclosure in this document.

In the present application, the inventors disclose a high-density, vertically-stacked plant cultivation system that can facilitate productive plant growth in indoor environments. The design aspects disclosed herein include features that can provide a more efficient, simple, cost-effective, and/or reliable cultivation system. Some of the features disclosed herein provide for increased plant density for a given overall volume of the system, in a way that overcomes challenges experienced when trying to do so. For example, the inventors found an increased density made it difficult to provide an optimal environment for plant growth for all plants cultivated in the system. Features disclosed herein attempt to address this issue by helping to provide a more homogenous supply of air (including various gasses), nutrient solution, and/or lighting to the plants being cultivated in the system.

Figure 1:
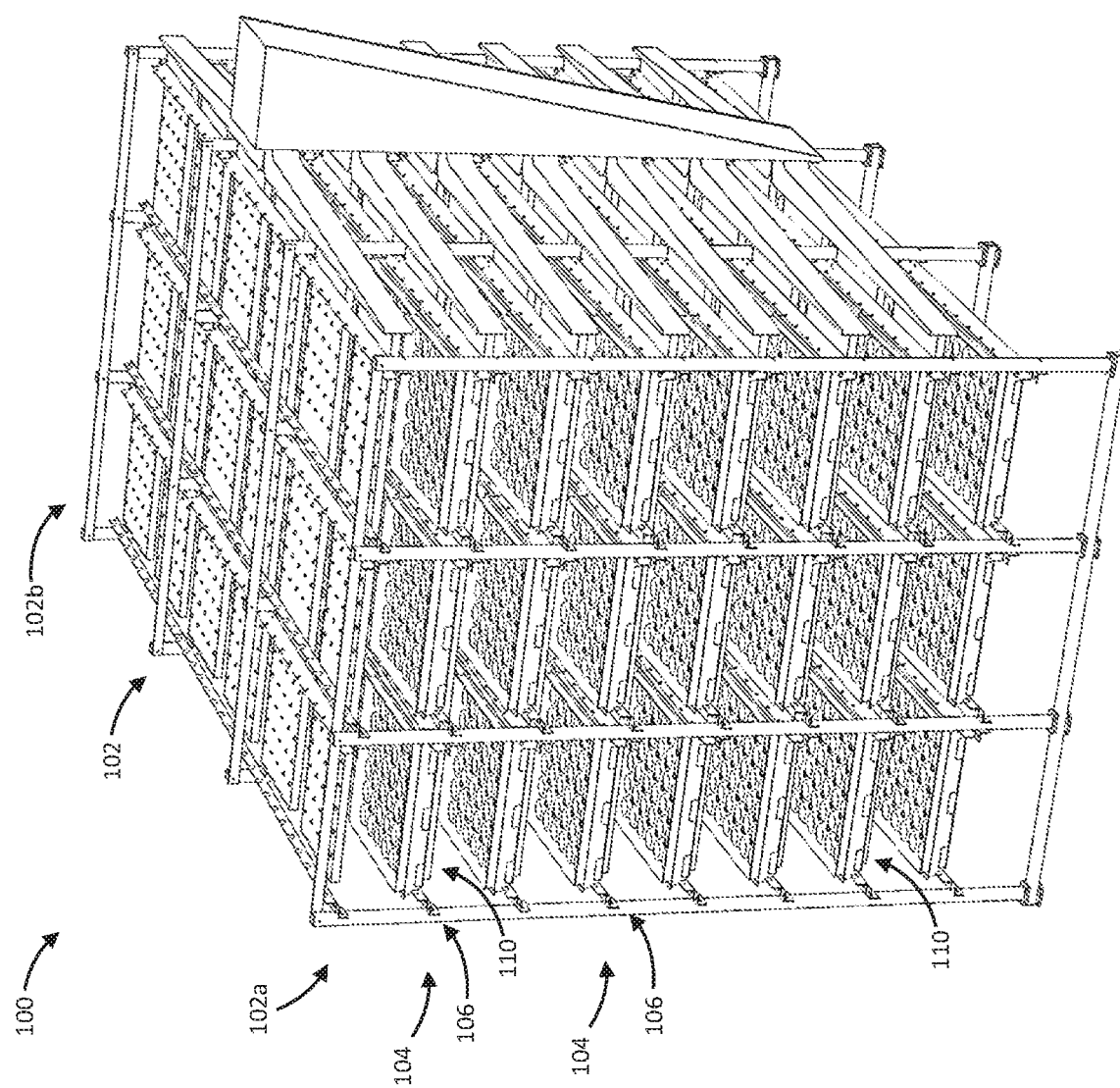
FIG. 1 is a perspective view of an example plant cultivation system.
Figure 1A:
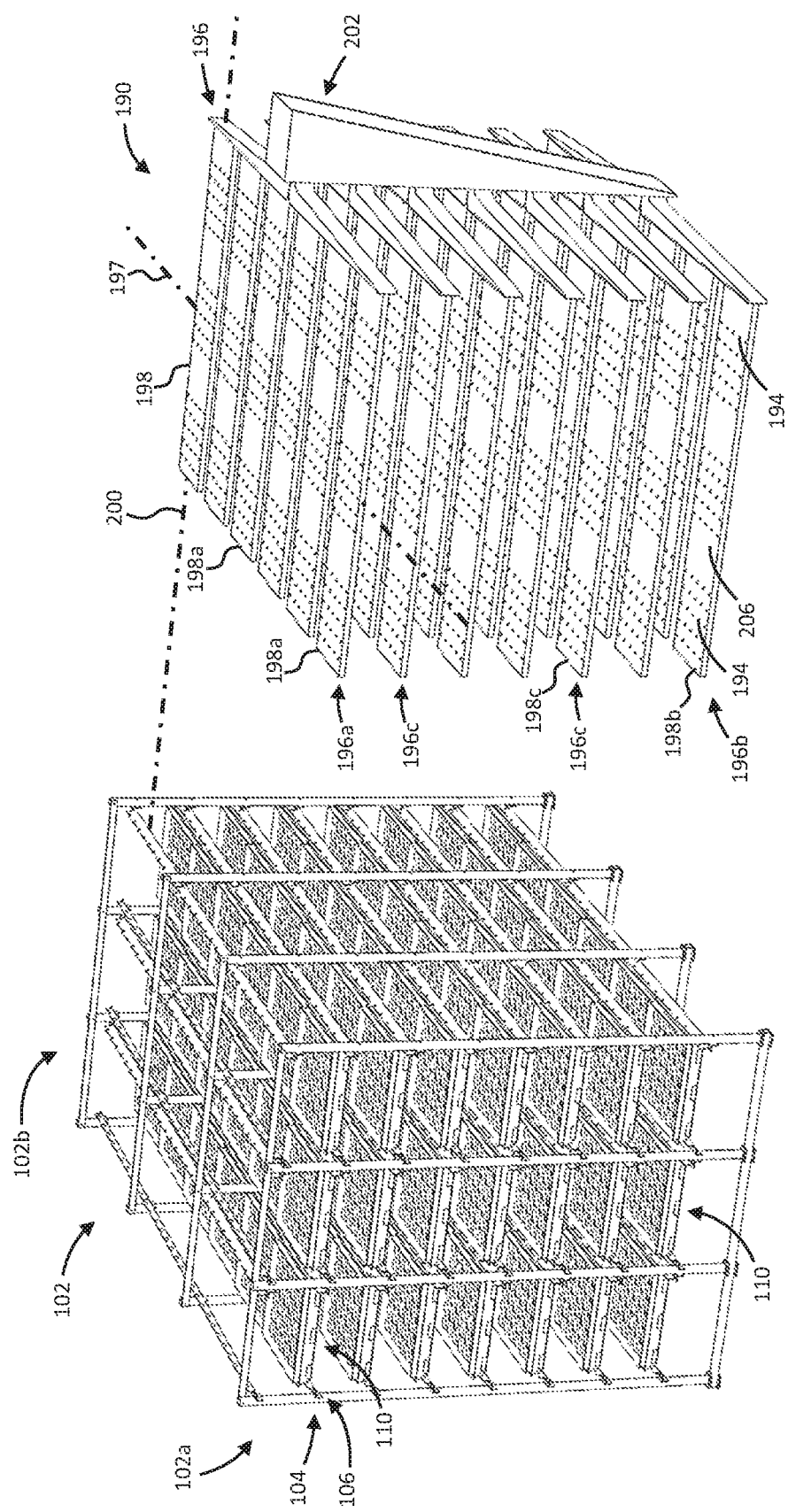
FIG. 1A is a partially exploded view of the system of FIG. 1.
Figure 2:
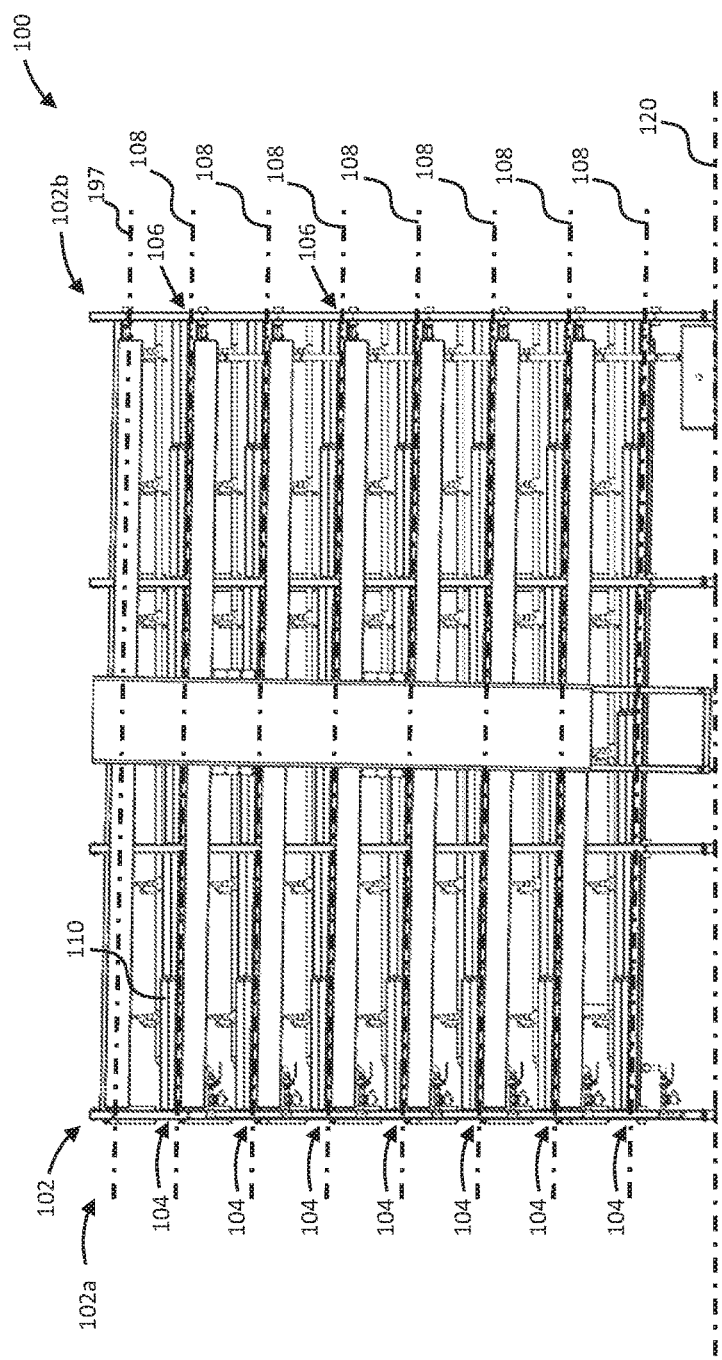
FIG. 2 is a side elevation view of the system of FIG. 1.

Referring to FIGS. 1 and 1A, in the example illustrated, a plant cultivation system 100 includes a frame 102 having a frame upstream end 102a and a frame downstream end 102b spaced horizontally apart from the frame upstream end 102a. Referring to FIG. 2, in the example illustrated, a plurality of vertically stacked conveyor assemblies 104 are mounted to the frame 102. Each conveyor assembly 104 includes at least one conveyor 106 (see also FIG. 3) extending between the frame upstream end 102a and the frame downstream end 102b along a conveyor axis 108. Referring to FIG. 4, in the example illustrated, each conveyor assembly 104 includes a plurality of the conveyors 106 mounted at a generally common elevation and arranged in side-by-side lanes. In the example illustrated, each conveyor assembly 104 includes three conveyors 106.

Figure 3:
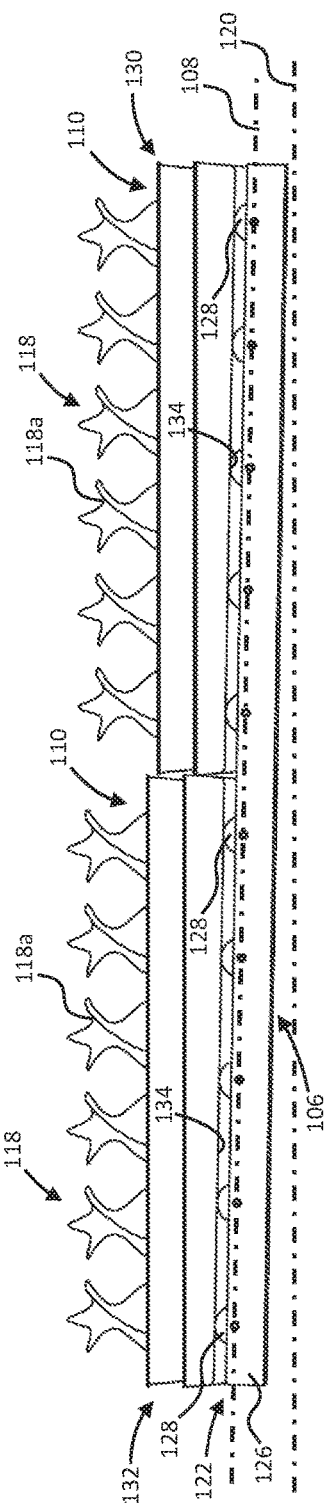
FIG. 3 is a schematic side view of a portion of the system of FIG. 1, showing plant cultivation trays supported on a conveyor of the system of FIG. 1.

Referring to FIGS. 2 and 3, in the example illustrated, a plurality of plant cultivation trays 110 are supported on each conveyor 106 for translation along a respective conveyor axis 108 toward the frame downstream end 102b. In the example illustrated, each of the conveyors 106 supports six of the plant cultivation trays 110. The plant cultivation trays 110 are supported on each conveyor adjacent one another along the conveyor axis 108.

Referring to FIG. 6, in the example illustrated, each plant cultivation tray 110 includes a tray body 112 having a tray top 114 and a tray bottom 115 vertically opposite the tray top 114 (see also FIG. 5). Each tray 110 further includes a plurality of plant cavities 116 in the tray body 112 and open to the tray top 114. The plant cavities 116 are for holding plants (e.g. plants 118 shown in FIG. 5). In the example illustrated, each tray 110 includes thirty-six plant cavities 116 arranged in a 6×6 array for holding thirty-six plants.

Referring to FIGS. 2 and 3, in the example illustrated, movement of the trays 110 along each conveyor 106 is gravity driven, with the conveyor axis 108 of each conveyor 106 sloping downwards relative to a horizontal plane 120 from the frame upstream end 102a to the frame downstream end 102b. The horizontal plane 120 is normal to the force of gravity. The plant cultivation trays 110 are rollingly supported on each conveyor 106 and urged to translate along a respective conveyor axis 108 toward the frame downstream end 102b via gravitational force. The conveyor axis 108 can slope downwardly relative to the horizontal plane 120 at an angle of between about, for example, 0.5 and 5 degrees. In some examples, the conveyor axis 108 slopes downwardly relative to the horizontal plane 120 at an angle of between about 0.5 and 1.5 degrees. In the example illustrated, the conveyor axis 108 slopes downwardly relative to the horizontal plane 120 at an angle of about 1 degree.

Referring to FIG. 5, in the example illustrated, each conveyor 106 includes a pair of supports 122 spaced laterally apart from one another by a conveyor opening 124. Referring to FIG. 3, in the example illustrated, each tray support 122 includes a rail 126 extending between the frame upstream end 102a and the frame downstream end 102b generally parallel with a respective conveyor axis 108, and a plurality of wheels 128 rotatably mounted to the rail 126 and spaced apart from one another along the conveyor axis 108 for rollingly supporting the trays 110 on the conveyor 106.

Referring still to FIG. 3, in the example illustrated, each plant cultivation tray 110 includes a tray front 130, a tray rear 132 axially opposite the tray front 130, and a pair of laterally spaced apart tray underside surfaces 134 in engagement with the wheels 128 of the pair of tray supports 122 to rollingly support the tray 110 on the conveyor 106 (see also FIG. 5). In the example illustrated, each underside surface 134 of the tray 110 slopes downwards relative to the horizontal plane 120 from the tray rear 132 to the tray front 130. When the plant cultivation trays 110 are supported on the conveyor 106, the tray underside surfaces 134 of each tray 110 are generally parallel with the conveyor axis 108.

Figure 10:
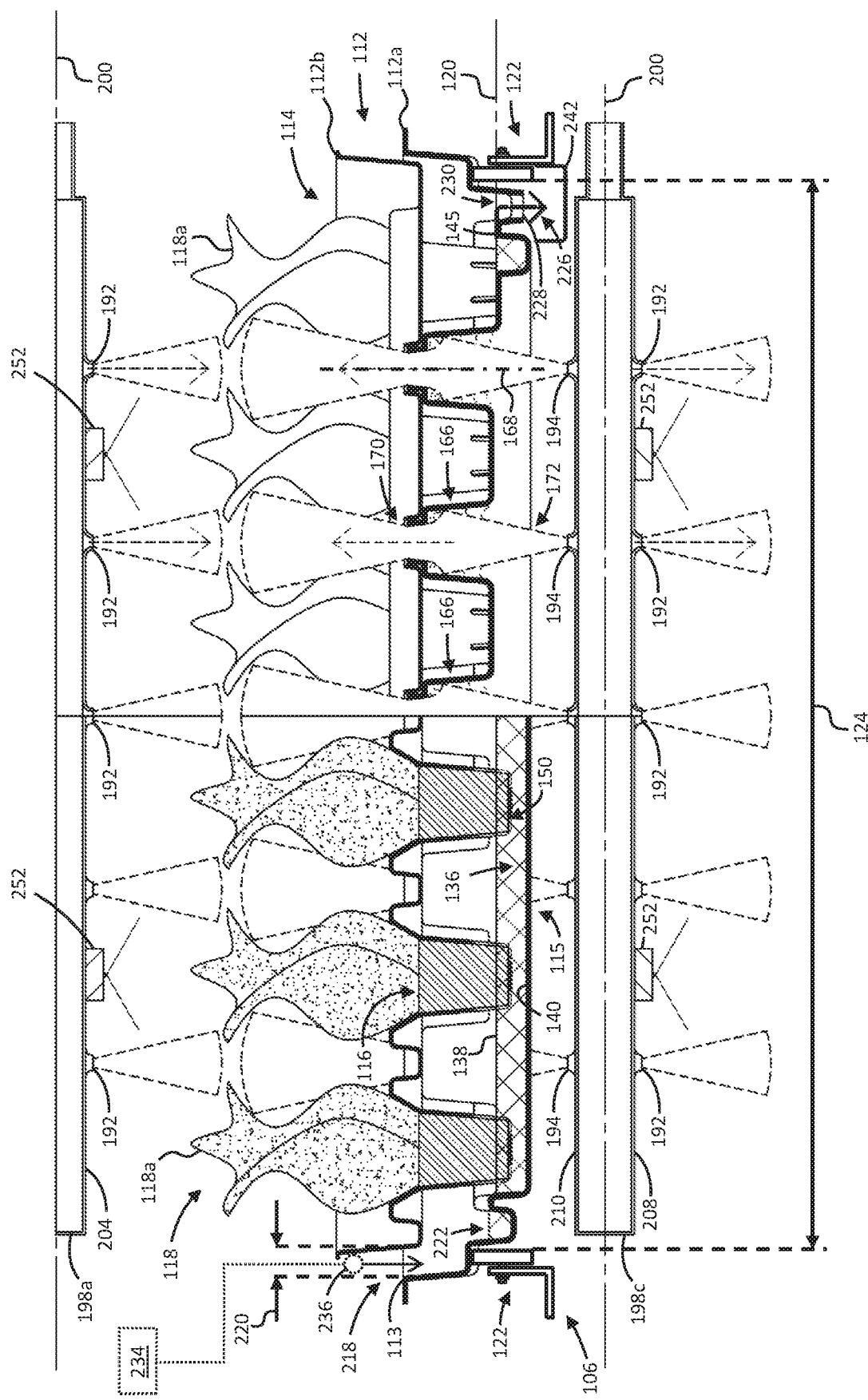
FIG. 10 is a schematic cross-sectional rear view of a portion of the system of FIG. 1, taken along a cross-sectional line like line 8-8 of FIG. 7.
Figure 11:
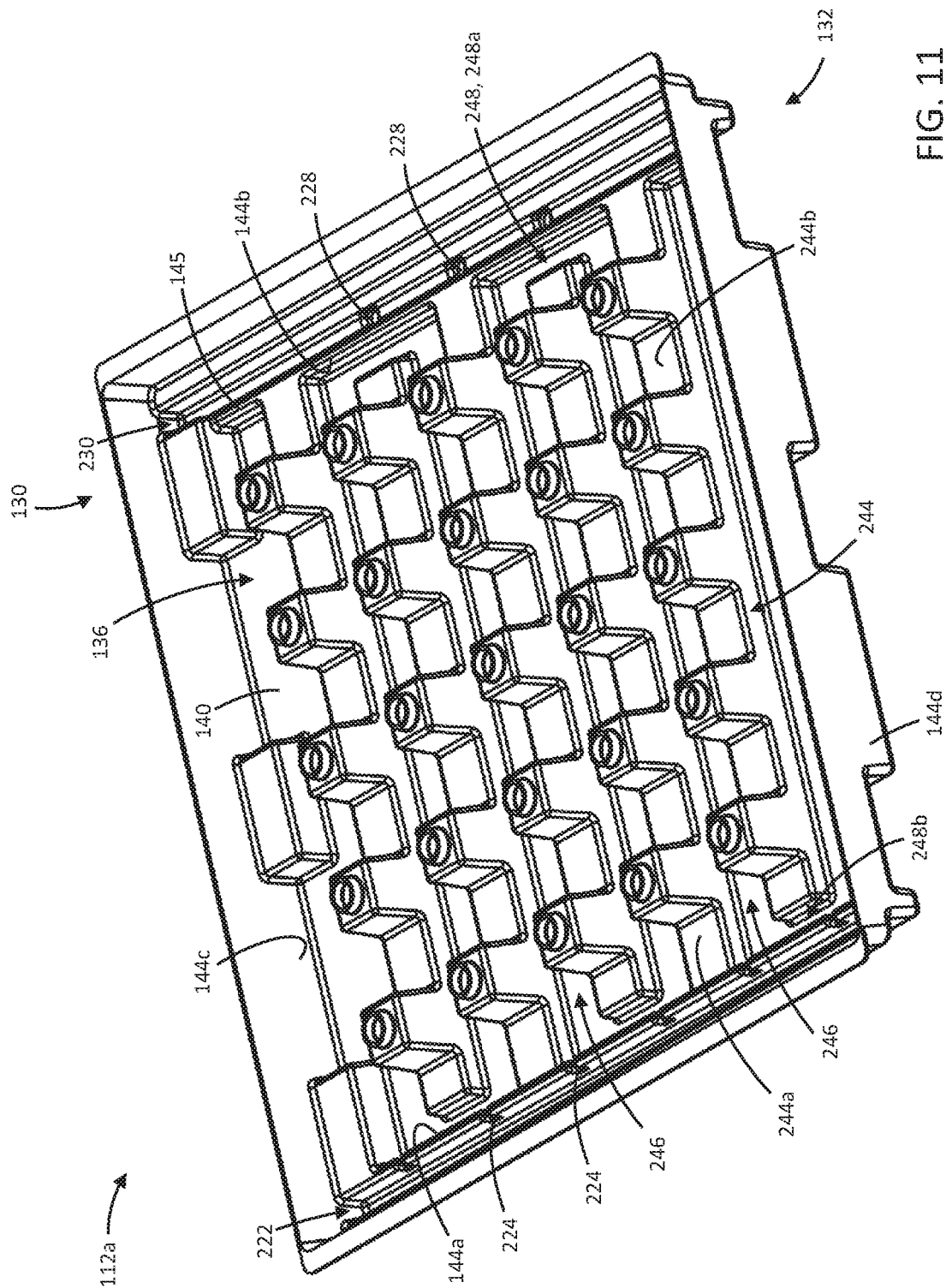
FIG. 11 is a perspective top view of a tray lower portion of the tray of FIG. 6.
Figure 12:
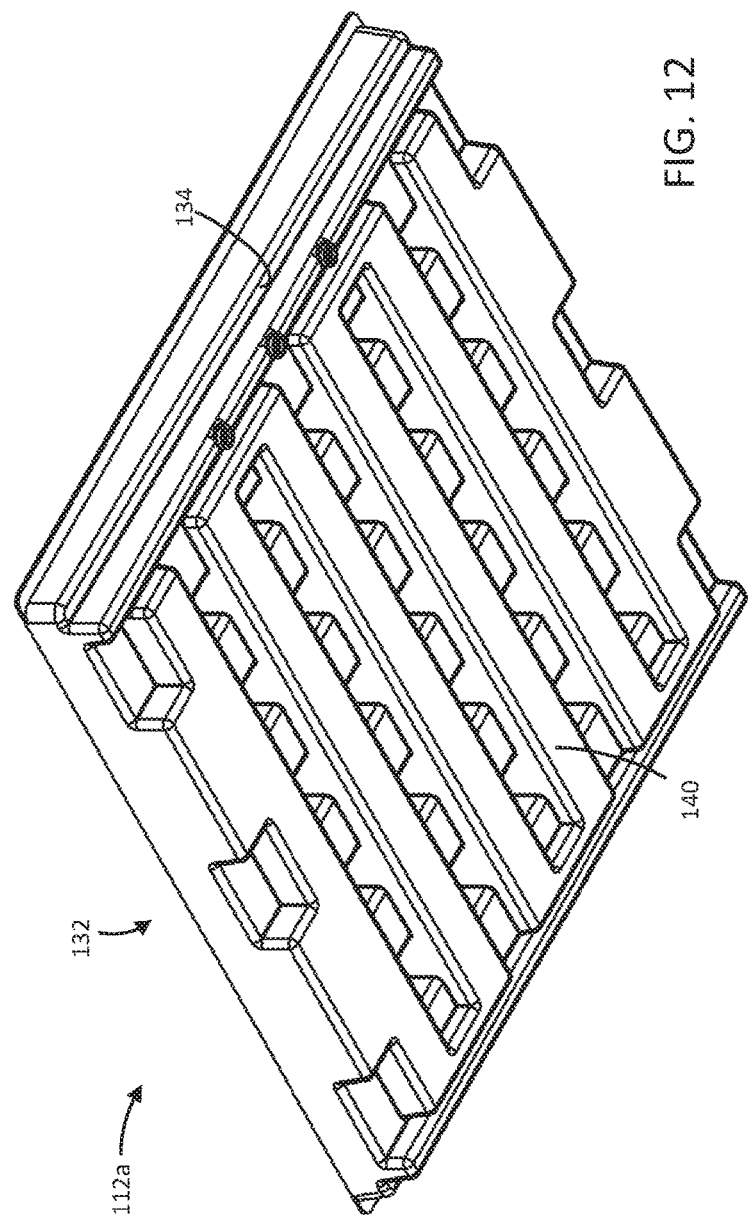
FIG. 12 is a perspective bottom view of the tray lower portion of FIG. 11.
Figure 13:
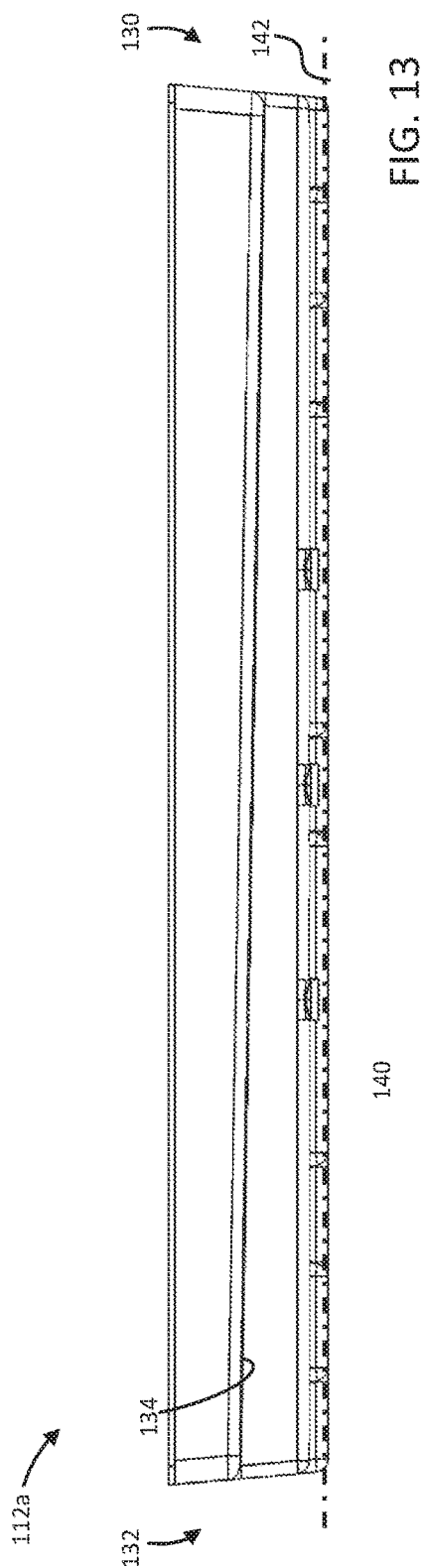
FIG. 13 is a side elevation view of the tray lower portion of FIG. 11.

Referring to FIGS. 8 and 9, in the example illustrated, each plant cultivation tray 110 includes a nutrient chamber 136 internal the tray body 112 and in fluid communication with the plant cavities 116 (see also FIGS. 10 and 11). The nutrient chamber 136 is for holding plant nutrient solution 138 (FIG. 10) to be provided to the plants 118 to facilitate plant growth. In the example illustrated, the tray body 112 includes a tray lower portion 112a and a tray upper portion 112b removably nested in the tray lower portion 112a. In the example illustrated, the nutrient chamber 136 is in the tray lower portion 112a, and the plant cavities 116 are in the tray upper portion 112b. The tray upper portion 112b can be removed from the tray lower portion 112a to facilitate, for example, access to internal portions of the tray 110, including, for example, the nutrient chamber 136. In the example illustrated, the plant cultivation tray 110 is of two-piece construction, and each of the tray lower portion 112a and the tray upper portion 112b is of integral, unitary, one-piece construction.

Referring still to FIGS. 8 and 9, in the example illustrated, the tray body 112 includes a nutrient chamber bottom wall 140 lying in a bottom wall plane 142 and a nutrient chamber sidewall 144 extending upwardly from a periphery of the nutrient chamber bottom wall 140. The nutrient chamber bottom wall 140 and the nutrient chamber sidewall 144 enclose the nutrient chamber 136 (see also FIGS. 10 and 11). In the example illustrated, the nutrient chamber bottom wall 140 is generally parallel with the horizontal plane 120 when the tray 110 is supported on the conveyor 106 for maintaining a generally constant depth of the plant nutrient solution across the nutrient chamber bottom wall 140. This can facilitate more homogenous nutrient uptake for each plant, across all cavities in the tray 110.

Referring to FIG. 8, in the example illustrated, the nutrient chamber bottom wall 140 is laterally intermediate and at an elevation below the tray underside surfaces 134. Referring to FIG. 10, when the plant cultivation tray 110 is supported on the conveyor 106, the nutrient chamber 136 is laterally intermediate the pair of tray supports 122, and extends into the conveyor opening 124.

Referring to FIG. 8, in the example illustrated, each plant cavity 116 extends along a cavity axis 146 between a cavity top end 148 open to the tray top 114 and a cavity bottom end 150 below the cavity top end 148. In the example illustrated, the cavity axis 146 is normal to the horizontal plane 120 when the tray 110 is supported on the conveyor 106. In the example illustrated, the cavity top ends 148 of the plant cavities 116 in each tray 110 lie in a common cavity top plane 152. In the example illustrated, the cavity top plane 152 is generally parallel with the horizontal plane 120 (and the bottom wall plane 142) when the tray 110 is supported on the conveyor 106.

In the example illustrated, the cavity bottom ends 150 of the plant cavities 116 in each tray 110 lie in a common cavity bottom plane 154. In the example illustrated, the cavity bottom plane 154 is generally parallel with the horizontal plane 120 (and the bottom wall plane 142) when the tray 110 is supported on the conveyor 106. In the example illustrated, each cavity bottom end 150 overlies the nutrient chamber bottom wall 140. Referring to FIG. 10, in the example illustrated, each cavity bottom end 150 is in the nutrient chamber 136 when the tray upper portion 112b is nested within the tray lower portion 112a (see FIG. 10).

Referring to FIG. 9, in the example illustrated, each plant cavity 116 is enclosed by a cavity bottom wall 156 defining the cavity bottom end 150, and a cavity sidewall 158 extending along the cavity axis 146 between the cavity bottom wall 156 and the cavity top end 148. In the example illustrated, the cavity bottom wall 156 is positioned in the nutrient chamber 136 when the tray upper portion 112b is nested in the tray lower portion 112a (see FIG. 10). At least one of the cavity bottom wall 156 and the cavity sidewall 158 has one or more perforations 159 for providing fluid communication between the nutrient chamber 136 and the plant cavity 116. In the example illustrated, each perforation passes through the cavity bottom wall 156 and the cavity sidewall 158. In the example illustrated, the tray upper portion 112b comprises the cavity bottom wall 156 and the cavity sidewall 158.

In the example illustrated, the cavity sidewall 158 includes a sidewall lower portion 160 extending from the cavity bottom wall 156 upwardly toward the cavity top end 148, and a sidewall upper portion 162 extending from the sidewall lower portion 160 to the cavity top end 148. In the example illustrated, the cavity bottom wall 156 and the sidewall lower portion 160 define a cavity lower portion 116a for holding plant roots. In the example illustrated, the sidewall upper portion 162 defines a cavity upper portion 116b, and is for supporting plant canopies of the plants (e.g. plant canopies 118a of the plants 118 shown in FIG. 10). In the example illustrated the sidewall upper portion 162 has an upper portion inner surface 164 for engagement with lower portions of the plant canopies to support and direct growth of the plant canopies (see FIG. 10). In the example illustrated, the upper portion inner surface 164 is generally frustoconical, and flares radially outwardly along the cavity axis 146 relative to the sidewall lower portion 160, from the sidewall lower portion 160 to the cavity top end 148.

Referring to FIG. 10, in the example illustrated, each tray 110 further includes at least one tray vent 166 passing vertically through the tray body 112. Each tray vent 166 is open to the tray top 114 and the tray bottom 115 for passing air vertically through the tray body 112 to facilitate delivery of air to the plants 118 from below. In the example illustrated, each tray vent 166 passes through the tray lower portion 112a and the tray upper portion 112b. In the example illustrated, each tray vent 166 extends along a vent axis 168 between a vent top end 170 open to the tray top 114 and a vent bottom end 172 open to the tray bottom 115. In the example illustrated, the vent axis 168 is normal to the horizontal plane 120 when the tray 110 is supported on the conveyor 106. Referring to FIG. 6, in the example illustrated, the tray 110 includes a plurality of the tray vents 166, with the tray vents 166 interposed between the plant cavities 116. In the example illustrated, each tray 110 includes twenty-five tray vents 166 arranged in a 5×5 array.

Referring to FIG. 9, in the example illustrated, the tray vents 166 pass vertically through the nutrient chamber 136 (see also FIGS. 10 and 11). In the example illustrated, each tray vent 166 is spaced horizontally inwardly from the nutrient chamber sidewall 144. In the example illustrated, each tray vent 166 includes a vent projection 174 extending upwardly from the nutrient chamber bottom wall 140 and through the nutrient chamber 136. The vent projection 174 has a hollow vent interior 176 in fluid isolation of the nutrient chamber 136, and a projection port 182 above the nutrient chamber 136 and providing fluid communication between the vent interior 176 and the tray top 114. In the example illustrated, the vent projection 174 includes a projection top wall 178 above the nutrient chamber 136 and a projection sidewall 180 extending between the nutrient chamber bottom wall 140 and the projection top wall 178. In the example illustrated, the projection sidewall 180 horizontally encloses the vent interior 176, and the projection port 182 is in the projection top wall 178. In the example illustrated, each tray vent 166 further includes a tray port 184 in the tray upper portion 112*b*. In the example illustrated, the projection port 182 provides fluid communication between the vent interior 176 and the tray top 114 through the tray port 184. In the example illustrated, the tray upper portion 112*b* is supported on the projection top walls 178 when nested in the tray lower portion 112*a*.

The plant cultivation system 100 can include an air handling system for providing air (and other gases) to the plants to facilitate plant growth. Referring to FIG. 1A, in the example illustrated, the air handling system includes an air delivery ductwork 190 for delivering air to the plants held in the trays 110. The air delivery ductwork 190 can be in fluid communication with an air conditioner to receive conditioned air for delivery to the plants 118. The air can be conditioned to have, for example, a humidity, temperature, and/or concentration of gases appropriate for optimizing growth of the plants being cultivated. In some examples, the air can be conditioned to have an air temperature of between about 20-25 degrees Celsius, a relative humidity of about 65%+/−5%, and a carbon dioxide concentration of between about 1000 ppm to 1500 ppm.

Referring to FIG. 10, in the example illustrated, the air delivery ductwork 190 includes a plurality of first ports 192 above each plant cultivation tray 110 supported on the conveyor assemblies 104 for discharging air from the air delivery ductwork 190 downwardly to deliver air to the plants 118 from above. The air delivery ductwork 190 further includes a plurality of second ports 194 below each plant cultivation tray 110 supported on the conveyor assemblies 104 for discharging air from the air delivery ductwork 190 upwardly to deliver air to the plants 118 from below via the tray vents 166. Delivering air to the plants 118 from both above and below can help improve the air distribution throughout the plant canopies 118*a* of the plants 118, can help improve plant growth, and can help provide a homogenous environment for all plants passing through the plant cultivation system 100.

In the example illustrated, the tray vents 166 of the trays 110 supported on the conveyor 106 are laterally intermediate the pair of tray supports 122 and overlying the conveyor opening 124. In the example illustrated, the upward discharge of air from the second ports 194 passes upwardly through the conveyor opening 124 and the tray vents 166 to deliver air to the plants 118 from below. In the example illustrated, the vent bottom end 172 of each tray vent 166 overlies at least one of the second ports 194 for receiving air discharged from the at least one of the second ports 194.

Referring to FIG. 1A, in the example illustrated, the air delivery ductwork 190 includes a plurality of duct assemblies 196 for conducting air to the first and second ports 192, 194. The duct assemblies 196 are spaced vertically apart from one another. In the example illustrated, the conveyor assemblies 104 and the duct assemblies 196 are vertically interposed between one another (see e.g. FIGS. 1 and 2).

In the example illustrated, the air delivery ductwork 190 includes a duct header 202 in fluid communication with each duct assembly 196 for conducting air thereto. The duct header 202 can be in fluid communication with the air conditioner for receiving conditioned air therefrom and conducting the conditioned air to each duct assembly 196.

In the example illustrated, each duct assembly 196 includes a plurality of ducts 198 for conducting respective streams of air to the first and/or second ports 192, 194. In the example illustrated, each duct assembly 196 includes six ducts 198. In the example illustrated, each duct 198 extends laterally across the conveyor assemblies 104 perpendicular to the conveyor axis 108. In the example illustrated, each duct 198 extends along a respective horizontal duct axis 200 between a duct first end in fluid communication with the duct header 202 for receiving air and a duct second end spaced horizontally apart from the duct first end. In the example illustrated, each duct axis 200 is generally perpendicular to the conveyor axes 108. In the example illustrated, the ducts 198 of each duct assembly 196 are spaced apart from one another along a respective duct assembly axis 197. In the example illustrated, the duct assembly axis 197 is generally parallel with the conveyor axis 108 (see also FIG. 2).

Referring still to FIG. 1A, in the example illustrated, the duct assemblies 196 include an upper duct assembly 196*a* above a set of the conveyor assemblies 104. The upper duct assembly 196*a* includes at least one upper duct 198*a*. Referring to FIG. 10, in the example illustrated, the upper duct 198*a* includes an upper duct bottom wall 204 facing the set of the conveyor assemblies 104, and a set of the first ports 192 in the upper duct bottom wall 204 for discharging air downwardly from the upper duct 198*a*.

Referring to FIG. 1A, in the example illustrated, the duct assemblies 196 further include a lower duct assembly 196*b* below the set of the conveyor assemblies 104. The lower duct assembly 196*b* includes at least one lower duct 198*b*. The lower duct 198*b* includes a lower duct top wall 206 facing the set of the conveyor assemblies 104, and a set of the second ports 194 in the lower duct top wall 206 for discharging air upwardly from the lower duct 198*b*.

Referring still to FIG. 1A, in the example illustrated, the duct assemblies 196 further include at least one intermediate duct assembly 196*c* vertically intermediate the upper and lower duct assemblies 196*a*, 196*b*. Each intermediate duct assembly 196*c* is vertically intermediate an upper one of the conveyor assemblies 104 above the intermediate duct assembly 196*c* and a lower one of the conveyor assemblies 104 below the intermediate duct assembly 196*c*. Each intermediate duct assembly 196*c* includes at least one intermediate duct 198*c*. Referring to FIG. 10, in the example illustrated, each intermediate duct 198*c* includes an intermediate duct bottom wall 208 facing the lower one of the conveyor assemblies 104, and a set of the first ports 192 in the intermediate duct bottom wall 208 for discharging air downwardly from the intermediate duct 198*c*. Each intermediate duct 198*c* further includes an intermediate duct top wall 210 vertically opposite the intermediate duct bottom wall 208 and facing the upper one of the conveyor assemblies 104, and a set of the second ports 194 in the intermediate duct top wall 210 for discharging air upwardly from the intermediate duct 198*c*.

In the example illustrated, the air handling system further includes an air recirculation system having a plurality of suction fans for suctioning air from between the conveyor assemblies 104 and into an air recirculation ductwork. The fans can be mounted to the frame vertically intermediate and laterally outboard of the conveyor assemblies 104. The air recirculation ductwork can conduct the suctioned air to the air conditioner for conditioning and delivery to the air delivery ductwork 190.

Referring to FIG. 10, in the example illustrated, each plant cultivation tray 110 includes a nutrient chamber inlet 218 in the tray body 112 for delivering plant nutrient solution to the nutrient chamber 136. In the example illustrated, the tray lower portion 112*a* includes an upper peripheral edge 113, and at least a portion of the upper peripheral edge 113 is spaced laterally outwardly apart from the tray upper portion 112*b* by an inlet spacing 220. In the example illustrated, the nutrient chamber inlet 218 comprises the inlet spacing 220.

Referring to FIG. 11, in the example illustrated, the nutrient chamber sidewall 144 includes a sidewall first portion 144*a* extending axially between the tray front 130 and the tray rear 132; a sidewall second portion 144*b* spaced laterally apart from the sidewall first portion 144*a* and extending axially between the tray front 130 and the tray rear 132; a sidewall third portion 144*c* extending laterally between the sidewall first and second portions 144*a*, 144*b*; and a sidewall fourth portion 144*d* spaced axially apart from the sidewall third portion 144*c* and extending laterally between the sidewall first and second portions 144*a*, 144*b*.

In the example illustrated, the nutrient chamber inlet 218 includes a nutrient delivery trough 222 internal the tray body 112 and separated from the nutrient chamber 136 by the sidewall first portion 144*a* (see also FIG. 10). In the example illustrated, the delivery trough 222 extends axially between the tray front and the tray rear 130, 132. Referring to FIG. 10, in the example illustrated, the inlet spacing 220 is open to the nutrient delivery trough 222 for supplying the plant nutrient solution to the nutrient delivery trough 222.

Referring to FIG. 11, in the example illustrated, the nutrient chamber inlet 218 further includes a plurality of sidewall apertures 224 in the sidewall first portion 144*a*. The sidewall apertures 224 are spaced apart from one another along an axial length of the sidewall first portion 144*a* for distributing plant nutrient solution from the nutrient delivery trough 222 to the nutrient chamber 136 along the axial length of the sidewall first portion 144*a*. In the example illustrated, each sidewall aperture 224 is open to an upper end of the sidewall first portion 144*a*.

Referring to FIG. 10, in the example illustrated, each plant cultivation tray 110 includes a nutrient chamber outlet 226 in the tray body 112 for draining plant nutrient solution from the nutrient chamber 136. In the example illustrated, the nutrient chamber 136 is horizontally intermediate the nutrient chamber inlet 218 and the nutrient chamber outlet 226. This can facilitate flow of fresh plant nutrient solution introduced at the nutrient chamber inlet 218 across the width of the nutrient chamber 136 for absorption by the plants, after which the depleted plant nutrient solution can flow out of the nutrient chamber 136 via the nutrient chamber outlet 226. In the example illustrated, the nutrient chamber outlet 226 includes a plurality of drainage ports 228 in the tray lower portion 112*a* for draining plant nutrient solution overflowing from the nutrient chamber 136.

Referring to FIG. 11, in the example illustrated, the nutrient chamber outlet 226 further includes a drainage trough 230 internal the tray body 112 and separated from the nutrient chamber 136 by the sidewall second portion 144*b*. In the example illustrated, the drainage trough 230 extends axially between the tray front 130 and the tray rear 132. In the example illustrated, the drainage ports 228 are in the drainage trough 230 for draining plant nutrient solution flowing over the sidewall second portion 144*b* from the nutrient chamber 136 to the drainage trough 230.

In the example illustrated, each of the sidewall first, second, third, and fourth portions 144*a*, 144*b*, 144*c*, 144*d* has a first, second, third, and fourth height, respectively above the nutrient chamber bottom wall 140. In the example illustrated, the second height of the sidewall second portion 144*b* is less than the first, third, and fourth heights of the sidewall first, third, and fourth portions 144*a*, 144*c*, 144*d*. The second height of the sidewall second portion 144*b* defines a height of the nutrient chamber 136, and a depth of the plant nutrient solution that can be held in the nutrient chamber 136. In the example illustrated, the sidewall second portion 144*b* has an upper edge 145 defining an upper boundary of the nutrient chamber 136.

The system 100 can further include a nutrient handling system for delivering the plant nutrient solution to the plant cultivation trays 110. Referring to FIG. 10, in the example illustrated, the nutrient handling system includes a nutrient delivery ductwork 234 (shown schematically in FIG. 10) having a plurality of nutrient delivery ports 236 (one of which is shown schematically in FIG. 10). Each nutrient delivery port 236 is adjacent to and in fluid communication with a respective nutrient chamber inlet 218 for delivering plant nutrient solution thereto.

In the example illustrated, the nutrient handling system can further include a nutrient recirculation system for recirculating the plant nutrient solution discharged from the nutrient chamber 136. The nutrient recirculation system can include a nutrient recirculation ductwork including a plurality of collection troughs 242 for capturing plant nutrient solution flowing out from the nutrient chamber outlet 226. In the example illustrated, each collection trough 242 is mounted to the frame 102 and has an open top extending below the drainage ports 228 of the trays 110 supported on a respective conveyor 106.

Referring to FIG. 11, in the example illustrated, the tray lower portion 112*a* includes a plurality of baffles 244 in the nutrient chamber 136. The baffles 244 can help suppress slosh of plant nutrient solution in the nutrient chamber 136, can facilitate distribution of plant nutrient solution across the nutrient chamber 136, and may help direct root growth of the plants. In the example illustrated, the baffles 244 are spaced axially apart from one another, and each baffle 244 extends upwardly from the nutrient chamber bottom wall 140 and laterally between the first and second sidewall portions 144*a*, 144*b* of the nutrient chamber sidewall 144. In the example illustrated, the baffles 244 comprise lower portions of the projection sidewalls 180 of the vent projections 174.

In the example illustrated, the nutrient chamber 136 comprises a plurality of lateral channels 246 extending laterally between the sidewall first and second portions 144*a*, 144*b*. The lateral channels 246 are separated axially from one another by the baffles 244. In the example illustrated, each sidewall aperture 224 of the nutrient chamber inlet 218 is open to a respective lateral channel 246 (see also FIG. 9), and is axially intermediate a respective pair of axially adjacent baffles 244. Referring to FIG. 9, in the example illustrated, the cavity bottom end 150 of each plant cavity 116 is axially intermediate a respective pair of axially adjacent baffles 244, and is positioned in a respective lateral channel 246 of the nutrient chamber 136 when the tray upper portion 112*b* is nested in the tray lower portion 112*a* (see also FIG. 10).

Referring to FIG. 11, in the example illustrated, the plurality of baffles 244 includes a set of first baffles 244*a* extending laterally from the sidewall first portion 144*a* toward the sidewall second portion 144*b*, and a set of second baffles 244*b* extending laterally from the sidewall second portion 144*b* toward the sidewall first portion 144*a*. The first baffles 244*a* and the second baffles 244*b* are axially interposed between one another.

In the example illustrated, the nutrient chamber 136 further includes a plurality of axial channels 248 extending axially across the baffles 244 for providing fluid communication between the lateral channels 246. In the example illustrated, the plurality of axial channels 248 includes a plurality of first axial channels 248a extending across the first baffles 244a laterally intermediate the first baffles 244a and the sidewall second portion 144b, and a plurality of second axial channels 248b extending across the second baffles 244b laterally intermediate the second baffles 244b and the sidewall first portion 144a.

The system 100 can further include a plant lighting system for providing homogenous lighting for all the plants being cultivated in the system 100 to facilitate plant growth. Referring to FIG. 10, in the example illustrated, the plant lighting system includes one or more lights 252 (e.g. LED lights) mounted above each plant cultivation tray 110.

Referring to FIGS. 14A and 14B, the system can optionally include an automated tray loader 254 adjacent the frame upstream end 102a for loading the plant cultivation trays 110 onto the conveyor assemblies 104. In the example illustrated, the tray loader 254 includes at least one loader carriage 256 movable between a loader first position (FIG. 14A) for receiving at least one plant cultivation tray 110, and at least one loader second position (FIG. 14B) spaced apart from the loader first position for loading the at least one plant cultivation tray 110 onto the conveyor assemblies 104 from the frame upstream end 102a. In the example illustrated, the loader first position and the loader second position are spaced vertically apart from one another.

In the example illustrated, the loader carriage 256 supports the plant cultivation trays 110 with the bottom wall plane 142 parallel with the horizontal plane 120. The tray loader 254 further includes a loader actuator 258 moveable between a loader closed position (FIG. 14A) for retaining the plant cultivation trays 110 in the loader carriage 256, and a loader open position (FIG. 14B) for releasing the plant cultivation trays 110 from the loader carriage 256 and onto respective conveyors 106. Referring to FIG. 14B, in the example illustrated, when the loader carriage 256 is in the loader second position and the loader actuator 258 is in the loader open position, the trays 110 in the loader carriage 256 are urged to translate from the loader carriage 256 and onto respective conveyors 106 via gravitational force.

The system 100 can optionally include a tray locking system 260 for inhibiting translation of the plant cultivations trays 110 supported on the conveyors 106. In the example illustrated, the locking system 260 includes a tray lock actuator 262 for each conveyor 106 adjacent the frame downstream end 102b. Each tray lock actuator 262 is movable between a locked position (shown in FIG. 14B with respect to both conveyors 106) for engagement with a respective plant cultivation tray 110 nearest the frame downstream end 102b to inhibit translation of the plant cultivation trays 110 supported on the conveyor 106, and an unlocked position (shown in FIG. 14A with respect to the upper conveyor 106) clear of the trays 110 for permitting translation of the trays 110 along the conveyor axis 108 toward the frame downstream end 102b via gravitational force.

The system 100 can optionally include an automated tray extractor 264 adjacent the frame downstream end 102b for extracting the plant cultivations trays 110 from the conveyor assemblies 104. The tray extractor 264 includes at least one extractor carriage 266 movable between an extractor first position (FIG. 14A) for extracting at least one plant cultivation tray 110 from the conveyor assemblies 104 at the frame downstream end 102b, and an extractor second position (FIG. 14B) spaced apart from the extractor first position for unloading the at least one plant cultivation tray 110 from the extractor carriage 266. In the example illustrated, the extractor first position and the extractor second position are spaced vertically apart from one another.

In the example illustrated, the extractor carriage 266 supports the plant cultivation trays 110 with the bottom wall plane 142 parallel with the horizontal plane 120. The tray extractor 264 further includes an extractor actuator 268 moveable between an extractor closed position (FIG. 14A) for retaining the plant cultivation trays 110 in the extractor carriage 266, and an extractor open position (FIG. 14B) for releasing the plant cultivation trays 110 from the extractor carriage 266. Referring to FIG. 14B, in the example illustrated, when the extractor carriage 266 is in the extractor second position and the extractor actuator 268 is in the extractor open position, the trays 110 in the extractor carriage 266 are urged to translate out from the extractor carriage 266 via gravitational force.

Operation of the system 100 will now be described with respect to a single conveyor 106. A plurality of the plant cultivation trays 110 are loaded onto the conveyor 106 at the frame upstream end 102a via the tray loader 254. The loaded trays 110 translate along the conveyor axis 108 toward the frame downstream end 102b via gravitational force, and are held at respective first locations along the conveyor axis 108 adjacent one another via the locking system 260. Plant nutrient solution is delivered to the nutrient chambers 136 of the trays 110, air is discharged downwardly from the first ports 192 and upwardly from the second ports 194 and delivered to the plants 118 from above and below, and light is provided to the plants 118 from above.

After a defined amount of time, the extractor carriage 266 is moved to the extractor second position and the lock actuator 262 is moved to the unlocked position. The trays 110 on the conveyor 106 translate via gravitational force further toward the frame downstream end 102b, with the tray 110 at the frame downstream end 102b translating into the extractor carriage 266, and the remaining trays 110 translating toward the frame downstream end 102b into respective second locations along the conveyor axis 108. The tray lock actuator 262 is moved to the locked position to hold the trays 110 supported on the conveyor 106 at the respective second locations. As each tray 110 is extracted from the frame downstream end 102b, another tray 110 can be loaded onto the conveyor 106 from the frame upstream end 102a.

The extractor carriage 266 holding the extracted tray 110 is moved from the extractor first position to the extractor second position. Once the extractor carriage 266 is in the extractor second position, the extractor actuator 268 is moved from the extractor closed position to the extractor open position for unloading the extracted tray 110 from the extractor carriage 266 for further handling. The plants in the trays 110 remaining on the conveyor 106 can receive further nutrients, air, and light, and/or the remaining trays 110 can be extracted for further handling and replaced with another set of trays 110.

Referring to FIG. 15, an example of another plant cultivation tray 1110 for a plant cultivation system like the system 100 is illustrated schematically. The tray 1110 has similarities to the tray 110, and like features are identified by like reference characters, incremented by 1000.

In the example illustrated, the plant cultivation tray 1110 includes a tray body 1112 having a tray top 1114 and a tray bottom 1115 vertically opposite the tray top 1115. The tray 1110 further includes a plurality of plant cavities 1116 in the tray body 1112 and open to the tray top 1114. In the example illustrated, the tray 1110 includes four plant cavities 1116 arranged in a 2×2 array.

Referring to FIG. 16, in the example illustrated, the tray 1110 further includes a nutrient chamber 1136 internal the tray body 1112 (see also FIGS. 18 and 19) and in fluid communication with the plant cavities 1116. In the example illustrated, the tray body 1112 further includes at least one first tray vent 1166a passing vertically through the tray body 1112. The first tray vent 1166a is open to the tray top 1114 and the tray bottom 1115 for passing air through the tray body 1112 to facilitate delivery of air to the plants held in the tray 1110 from below. In the example illustrated, the first tray vent 1166a passes vertically through the nutrient chamber 1136. In the example illustrated, the tray 1110 include a single first tray vent 1166a centered horizontally between the plant cavities 1116.

In the example illustrated, the tray 1110 further includes a plurality of second tray vents 1166b passing vertically through the tray body 1112. Each second tray vent 1166b is open to the tray top 1114 and the tray bottom 1115 for passing air through the tray body 1112 to facilitate delivery of air to the plants held in the tray 1110 from below. Referring to FIG. 15, in the example illustrated, the tray 1110 includes a tray sidewall 1270 extending between the tray top 1114 and the tray bottom 1115. The tray sidewall 1270 has a horizontally outwardly directed sidewall outer surface 1272 and a plurality of vent recesses 1274 extending horizontally inward of the sidewall outer surface 1272 and open to the tray top 1114 and the tray bottom 1115. In the example illustrated, the second tray vents 1166b comprise the vent recesses 1274.

Referring to FIG. 16, in the example illustrated, the tray sidewall 1270 includes a sidewall front portion 1270a at a tray front 1130 of the tray 1110, a sidewall rear portion 1270b (FIG. 15) at a tray rear 1132 (FIG. 15) of the tray 1110 and axially opposite the sidewall front portion 1270a, a sidewall left portion 1270c extending between the sidewall front and rear portions 1270a, 1270b, and a sidewall right portion 1270d laterally opposite the sidewall left portion 1270c and extending between the sidewall front and rear portions 1270a, 1270b.

In the example illustrated, the vent recesses 1274 include at least one front vent recess 1274a in the sidewall front portion 1270a and at least one rear vent recess 1274b (FIG. 15) in the sidewall rear portion 1270b. When a plurality of the trays 1110 are positioned axially adjacent one another (e.g. when the trays 1110 are supported on a conveyor), the front and rear vent recesses 1274a, 1274b of axially adjacent trays 1110 are open to and in registration with one another to facilitate delivery of air upwardly therethrough.

Referring still to FIG. 16, in the example illustrated, the vent recesses 1274 further include at least one left vent recess 1274c in the sidewall left portion 1270c and at least one right vent recess 1274d in the sidewall right portion 1270d. When the trays 1110 are supported laterally adjacent one another (e.g. when the trays 1110 are supported on side-by-side conveyors), the left and right vent recesses 1274c, 1274d of laterally adjacent trays 1110 are open to and in registration with one another to facilitate delivery of air upwardly therethrough.

Figure 17:
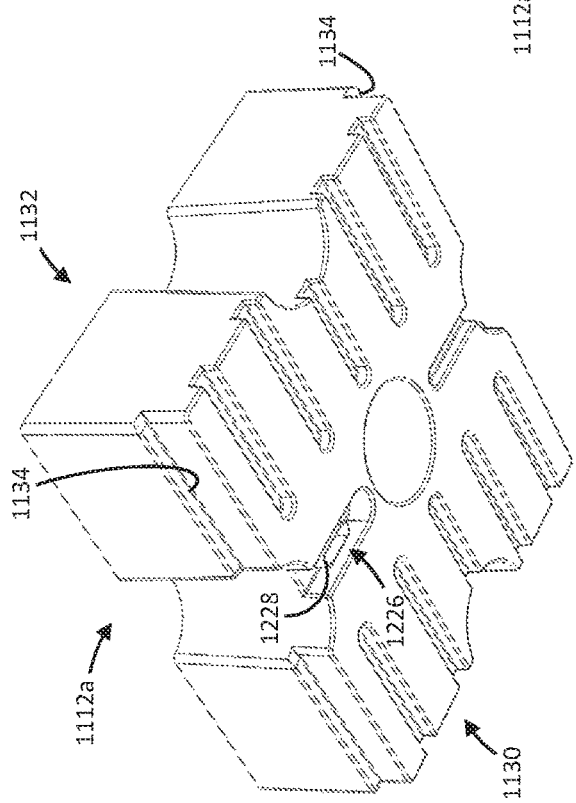
FIG. 17 is a bottom perspective view of the tray of FIG. 15.

Referring to FIG. 17, in the example illustrated, the tray 1100 includes a pair of laterally spaced apart tray underside surfaces 1134 for engagement with wheels of a gravity conveyor (e.g. like the gravity conveyor 106) to rollingly support the tray 1110 on the conveyor. In the example illustrated, when the tray is supported on the gravity conveyor, each underside surface 1134 slopes downwards relative to a horizontal plane from the tray rear 1132 to the tray front 1130.

Figure 19:
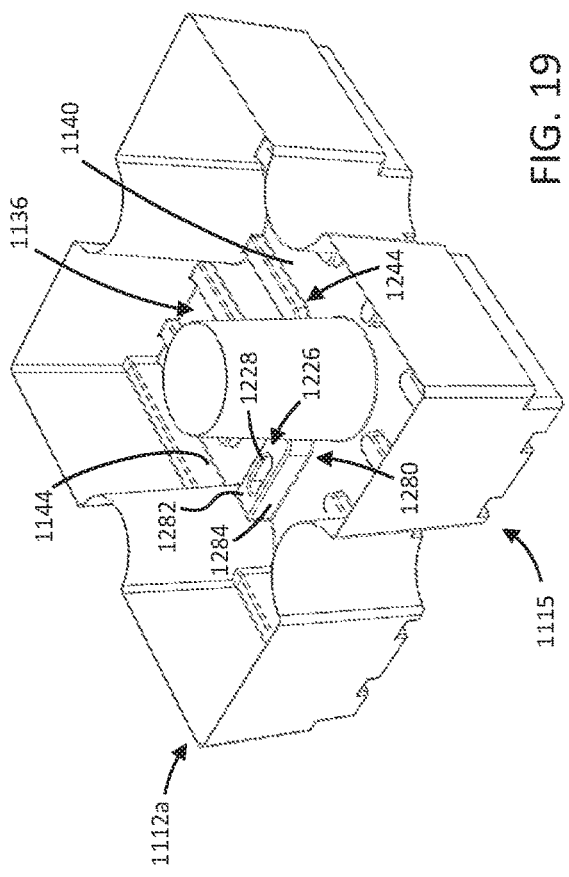
FIG. 19 is a top perspective view like that of FIG. 18, but with the raised floor removed.

Referring to FIG. 19, in the example illustrated, the tray body 1112 includes a nutrient chamber bottom wall 1140 lying in a bottom wall plane and a nutrient chamber sidewall 1144 extending upwardly from a periphery of the nutrient chamber bottom wall 1140. The nutrient chamber bottom wall 1140 and the nutrient chamber sidewall 1144 enclose the nutrient chamber 1136. In the example illustrated, the nutrient chamber bottom wall 1140 is generally parallel with the horizontal plane when the tray 1110 is supported on the conveyor for maintaining a generally constant depth of the plant nutrient solution across the nutrient chamber bottom wall 1140.

Referring to FIG. 16, in the example illustrated, the tray body 1112 includes a tray lower portion 1112a and a tray upper portion 1112b removably nested in the tray lower portion 1112a. In the example illustrated, the nutrient chamber 1136 is in the tray lower portion 1112a, and the plant cavities 1116 are in the tray upper portion 1112b.

Referring still to FIG. 16, in the example illustrated, the plant cultivation tray 1110 includes a nutrient chamber inlet 1218 in the tray body 1112 for delivering plant nutrient solution to the nutrient chamber 1136. In the example illustrated, the nutrient chamber inlet 1218 comprises a plurality of inlet ports 1278 in the tray upper portion 1112b. In the example illustrated, the inlet ports 1278 are above and open to the nutrient chamber 1136.

In the example illustrated, the plant cultivation tray 1110 further includes a nutrient chamber outlet 1226 in the tray body 1112 for draining plant nutrient solution overflowing from the nutrient chamber 1136. In the example illustrated, the nutrient chamber outlet 1226 comprises at least one drainage port 1228 in the tray lower portion 1112a. In the example illustrated, the tray lower portion 1112a includes a hollow drainage projection 1280 extending upwardly from the nutrient chamber bottom wall 1140 and through the nutrient chamber 1136 (see also FIG. 19). The drainage projection 1280 includes a drainage top wall 1282 above the nutrient chamber bottom wall 1140, and a drainage sidewall 1284 extending between the chamber bottom wall 1140 and the drainage top wall 1282. In the example illustrated, the drainage port 1228 passes vertically through the drainage top wall 1282 and is open to the tray bottom 1115 (see also FIG. 17).

Figure 18:
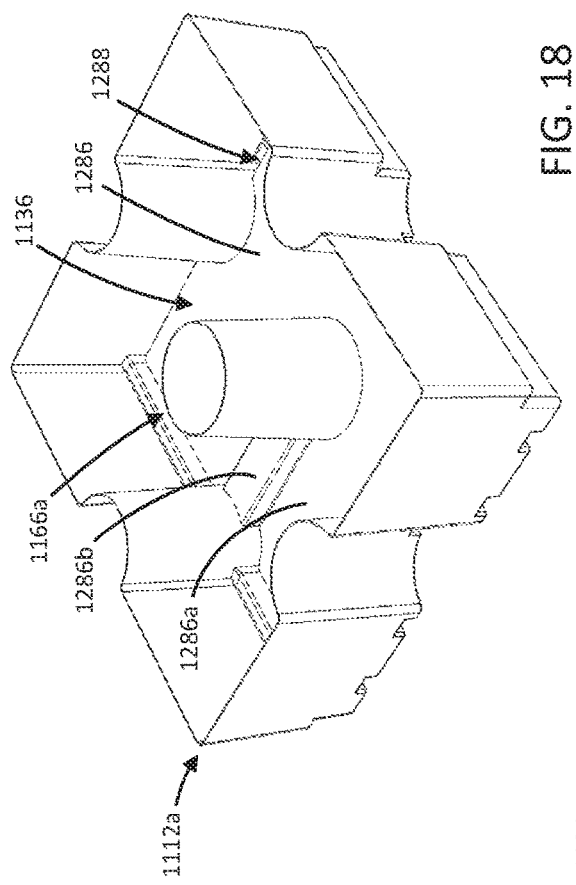
FIG. 18 is a top perspective view of a lower portion and raised floor of the tray of FIG. 15.

Referring to FIG. 18, in the example illustrated, the plant cultivation tray 1110 further includes an optional raised floor 1286 nested in the nutrient chamber 1136 and spaced above the nutrient chamber bottom wall 1140. In the example illustrated, the raised floor 1286 includes a floor first portion 1286a vertically intermediate the nutrient chamber bottom wall 1140 and the plant cavities 1116, and a floor second portion 1286b overlying the nutrient chamber outlet 1226 to isolate the nutrient chamber outlet 1226 from the plant cavities 1116 (see also FIG. 16). This can help inhibit blockage of the nutrient chamber outlet 1226 by plant roots extending into the nutrient chamber 1136.

Referring to FIG. 16, in the example illustrated, the floor first portion 1286a vertically separates the nutrient chamber 1136 into a lower volume 1136a below the floor first portion 1286a and an upper volume 1136b above the floor first portion 1286a and in fluid communication with the upper volume 1226b via one or more floor openings 1288 (FIG. 18). In the example illustrated, the plant cavities 1116 are in fluid communication with the upper volume 1236b of the nutrient chamber 1136. In the example illustrated, the floor first portion 1286a lies in a floor plane that is generally parallel with the horizontal plane when the tray 1110 is supported on the conveyor.

Referring to FIG. 19, in the example illustrated, the plant cultivation tray 1110 further includes a plurality of baffles 1244 in the nutrient chamber 1136. In the example illustrated, the baffles 1244 extend upwardly from the nutrient chamber bottom wall 1140, and are vertically intermediate the nutrient chamber bottom wall 1140 and the raised floor 1286.

Referring to FIG. 16, in the example illustrated, the tray upper portion 1112*b* is of multi-piece construction, and includes a frame 1290 supported by the tray lower portion 1112*a* and a plurality of plant pots 1292 removably mounted to the frame 1290 and enclosing respective plant cavities 1116.

Figure 20:
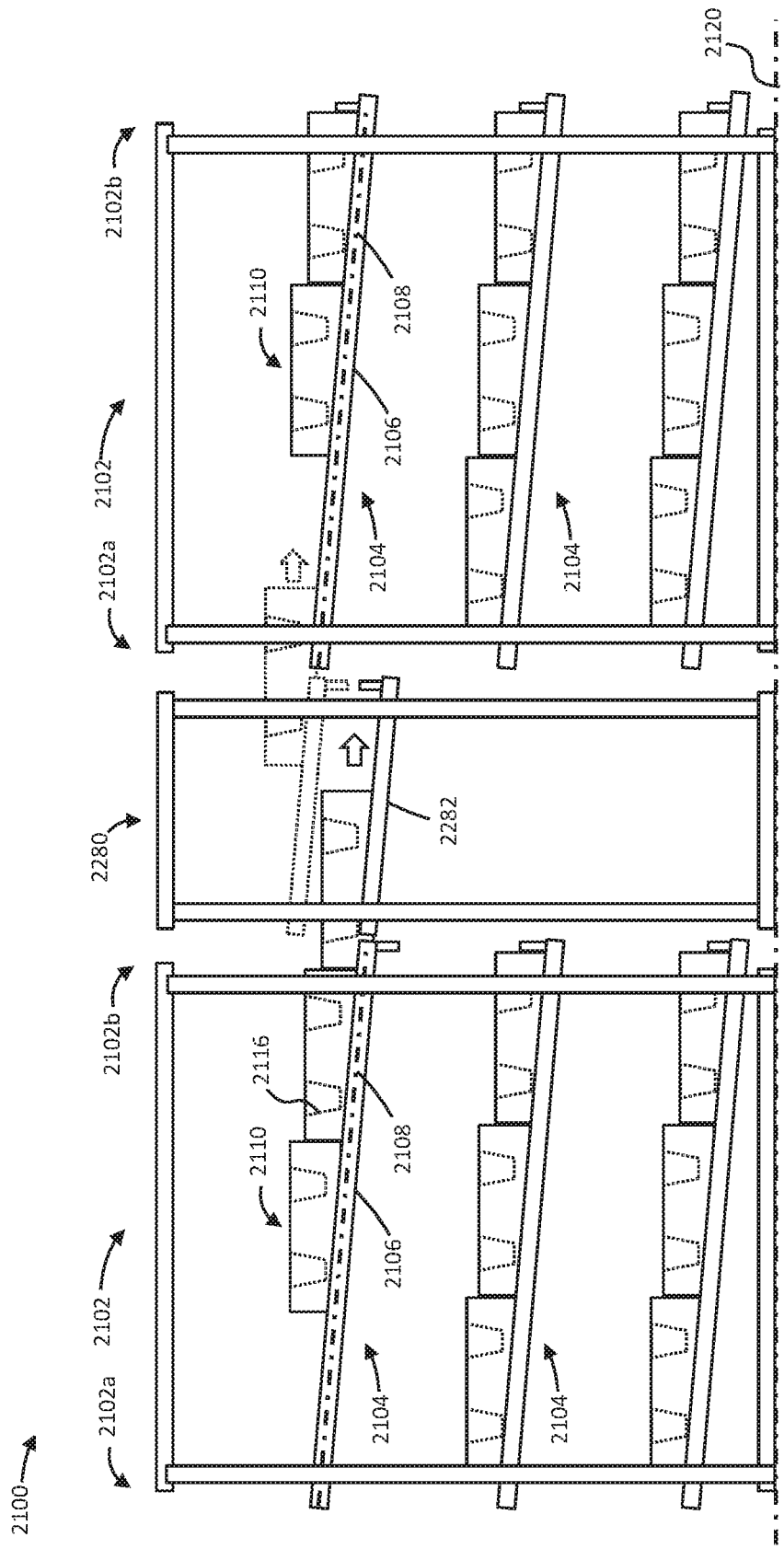
FIG. 20 is a schematic side elevation view of another example plant cultivation system.

Referring to FIG. 20, an example of another plant cultivation system 2100 is illustrated schematically. The system 2100 has similarities to the system 100, and like features are identified by like reference characters, incremented by 2000.

In the example illustrated, the system 2100 includes a plurality of frames 2102. Each frame 2102 has a frame upstream end 2102*a* and a frame downstream end 2102*b* spaced horizontally apart from the frame upstream end 2102*a*. The frames 2102 are positioned in series with the downstream end 2102*b* of a first one of the frames 2102 adjacent an upstream end 2102*a* of a second one of the frames 2102.

In the example illustrated, the system 2100 further includes a plurality of vertically stacked conveyor assemblies 2104 mounted to each frame 2102. Each conveyor assembly 2104 includes at least one gravity conveyor 2106 extending between the frame upstream end 2102*a* and the frame downstream end 2102*b* along a respective conveyor axis 2108. In the example illustrated, the conveyor axis 2108 slopes downwards relative to a horizontal plane 2120 from the frame upstream end 2102*a* to the frame downstream end 2102*b*.

In the example illustrated, the system 2100 further includes a plurality of plant cultivation trays 2110 rollingly supported on each conveyor 2106 and urged to translate along a respective conveyor axis 2108 toward the frame downstream end 2102*b* via gravitational force. Each plant cultivation tray 2110 includes a tray body having a tray top and a tray bottom vertically opposite the tray top. Each tray further includes a plurality of plant cavities 2116 in the tray body and open to the tray top. The plant cavities 2116 are for holding plants.

In the example illustrated, the system 2100 further includes an automated tray transfer mechanism 2280 axially intermediate the downstream end 2102*b* of the first one of the frames 2102 and the upstream end 2102*a* of the second one of the frames 2102. The tray transfer mechanism 2280 includes at least one transfer carriage 2282 movable between a receiving position (shown in solid lines) for receiving at least one tray 2110 from the conveyor assemblies 2104 mounted to the first one of the frames 2102, and a transfer position (shown in phantom lines) above the receiving position for loading the at least one tray 2110 onto the conveyor assemblies 2104 mounted to the second one of the frames 2102.

Figure 21:
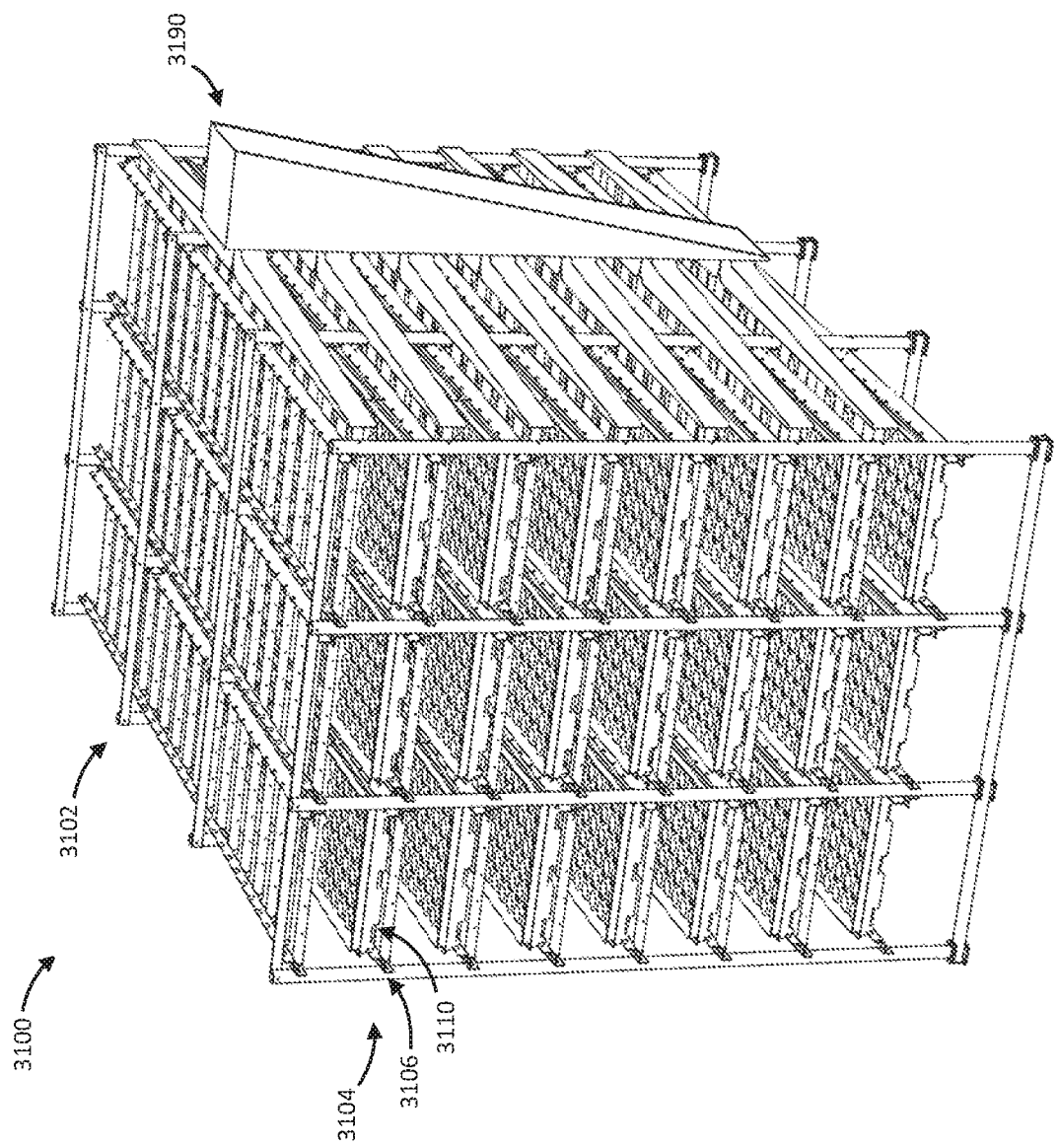
FIG. 21 is a perspective view of another example plant cultivation system.

Referring to FIG. 21, an example of another plant cultivation system 3100 is illustrated schematically. The system 3100 has similarities to the system 100, and like features are identified by like reference characters, incremented by 3000.

In the example illustrated, the plant cultivation system 3100 includes a frame 3102 and a plurality of vertically stacked conveyor assemblies 3104 mounted to the frame 3102. A plurality of plant cultivation trays 3110 are supported on each conveyor 3106 of the assemblies 3104 for translation along a respective conveyor axis.

Referring to FIG. 21A, in the example illustrated, the plant cultivation system 3100 includes an air handling system having an air delivery ductwork 3190 for delivering air to plants held in the trays 3110. In the example illustrated, the air delivery ductwork 3190 includes a plurality of first ports 3192 (FIG. 22) above each plant cultivation tray 3110 supported on the conveyor assemblies 3104 for discharging air from the air delivery ductwork 3190 downwardly to deliver air to the plants from above. In some examples, each first port 3192 can be in alignment with (and overlie) a respective plant cavity (and in some examples, a head of a respective plant held in the cavity). The air delivery ductwork 3190 further includes a plurality of second ports 3194 below each plant cultivation tray 3110 supported on the conveyor assemblies 3104 for discharging air from the air delivery ductwork 3190 upwardly to deliver air to the plants from below (e.g. through tray vents). In some examples, the second ports may be omitted.

In the example illustrated, the air delivery ductwork 3190 includes a plurality of vertically spaced apart duct assemblies 3196 for conducting air to the first and second ports 3192, 3194 (FIG. 22), and a duct header 3202 in fluid communication with each duct assembly 3196 for conducting air thereto. In the example illustrated, each duct assembly 3196 includes a plurality of ducts 3198 for conducting respective streams of air to the first and/or second ports. In the example illustrated, each duct assembly 3196 includes eighteen ducts 3198. Referring to FIG. 22, in the example illustrated, each duct 3198 comprises a tube having a generally circular cross-section. Providing tubular ducts may help to, for example, reduce manufacturing costs of the air delivery ductwork 3190.

Referring still to FIG. 22, in the example illustrated, each duct 3198 includes a duct bottom wall 3208 and a duct top wall 3210 vertically opposite the duct bottom wall 3208. In the example illustrated, a set of the first ports 3192 are provided in the duct bottom wall 3208 for discharging air downwardly from the duct 3198, and a set of the second ports 3194 are provided in the duct top wall 3210 for discharging air upwardly from the duct 3198. In the example illustrated, each duct 3198 includes sidewalls 3211 extending between the bottom and top walls 3208 and 3210, and optionally, a set of side ports 3195 in the sidewalls for discharging air sideways from the duct 3198.

Referring to FIG. 23, an example of another plant cultivation system 4100 is shown. The system 4100 has similarities to the system 100, and like features are identified by like reference characters, incremented by 4000.

In the example illustrated, the system 4100 includes a frame 4102 and a plurality of vertically stacked conveyor assemblies 4104 mounted to the frame 4102. Each conveyor assembly 4104 includes a plurality of conveyors 4106 each extending along a conveyor axis 4108 for supporting a plurality of plant cultivation trays 4110. In the example illustrated, the conveyors 4106 of each conveyor assembly 4104 are mounted at a generally common elevation and arranged in side-by-side lanes, and include a first conveyor 4106*a* and a second conveyor 4106*b* spaced laterally apart from and extending parallel with the first conveyor 4106*a*. In the example illustrated, each conveyor assembly 4104 further includes a third conveyor 4106*c* laterally outboard of the first conveyor 4106*a*, and a fourth conveyor 4106*d* laterally outboard of the second conveyor 4106*b*.

In the example illustrated, the plant cultivation system 4100 further includes an air handling system comprising an air delivery ductwork 4190 for delivering air to plants held in the trays 4110 supported on the conveyors 4106. In the example illustrated, the air delivery ductwork 4190 includes one or more duct headers 4202 laterally intermediate the first and second conveyors 4106a, 4106b, a plurality of first duct assemblies 4196a (FIG. 24) extending laterally from a first side of the duct headers 4202 for delivering air to plants held in trays 4110 supported on each first conveyor 4106a (and each third conveyor 4106c in the example illustrated), and a plurality of second duct assemblies 4196b (FIG. 24) extending laterally from a second side of the duct headers 4202 opposite the first side for delivering air to plants held in trays 4110 supported on each second conveyor 4106b (and each fourth conveyor 4106d in the example illustrated).

Positioning the duct headers 4202 between the first and second conveyors 4106a, 4106b can help to, for example, provide the system 4100 with generally open sides that are generally free of obstructions. This may facilitate more convenient access to the conveyors 4106 and/or other system components, particularly in plant cultivation systems that include wide conveyor assemblies (for example, conveyor assemblies with a high number of side-by-side conveyors, or with wide conveyors). This may help with, for example, cleaning and/or sanitizing, inspection, maintenance, and/or component adjustment or replacement.

Figure 24:
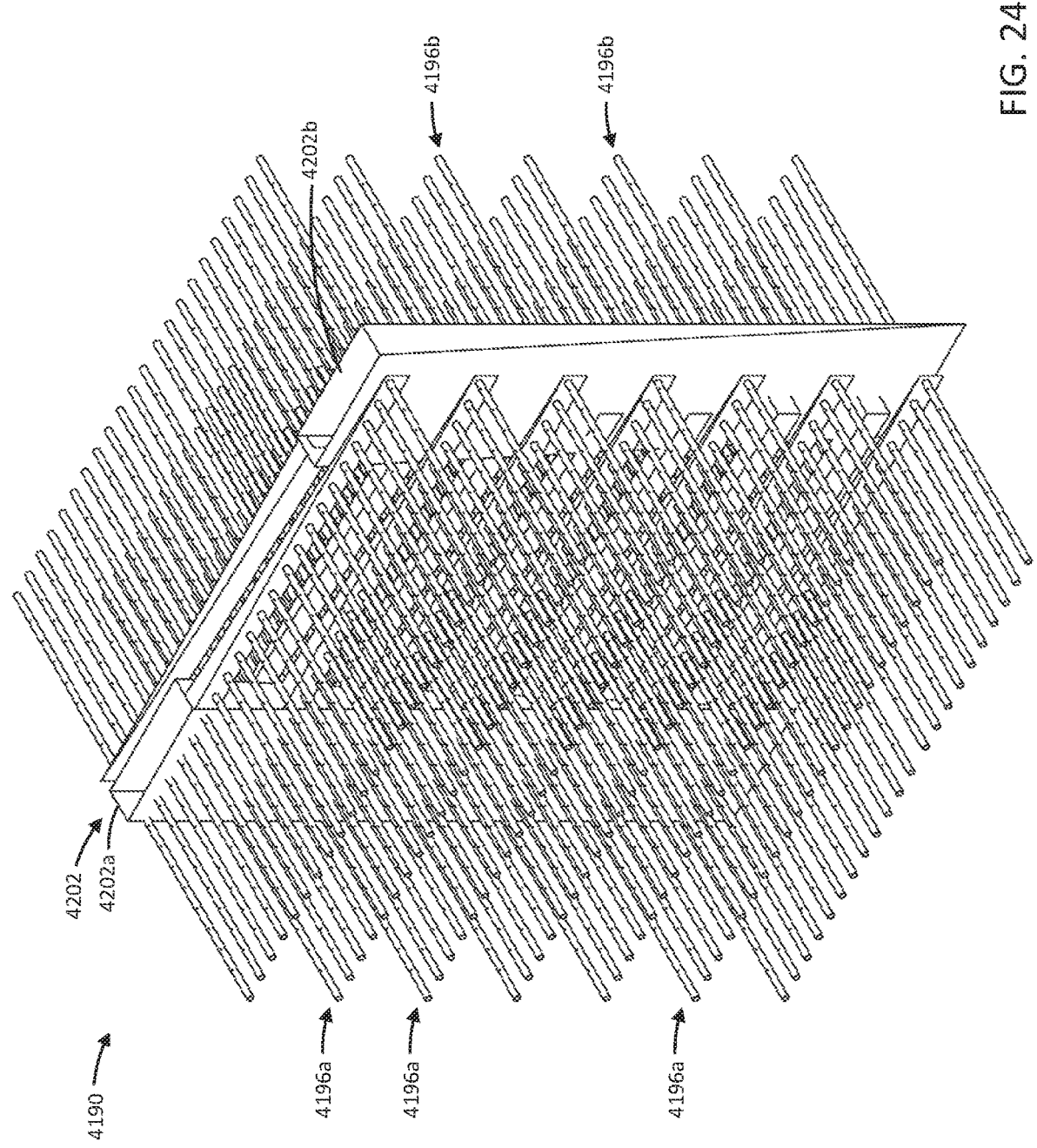
FIG. 24 is a perspective view of an air delivery ductwork of the system of FIG. 23.

Referring to FIG. 24, in the example illustrated, the one or more duct headers 4202 include a first duct header 4202a in fluid communication with the first duct assemblies 4196a for conducting air thereto, and a second duct header 4202b in fluid communication with the second duct assemblies 4196b for conducting air thereto. In the example illustrated, the first duct header 4202a is spaced axially apart from the second duct header 4202b. In the example illustrated, the first and second duct headers 4202a, 4202b are oriented generally vertically for conducting air in a generally vertical direction (laterally intermediate the first and second conveyors 4106a, 4106b), and the first and second duct assemblies 4196a, 4196b are oriented generally horizontally for conducting air in a generally horizontal direction (above and/or below the conveyor assemblies 4104).

Referring to FIG. 23, the system 4100 further includes an automated tray loader 4254 adjacent a frame upstream end 4102a for loading the plant cultivation trays 4110 onto the conveyor assemblies 4104. In the example illustrated, the tray loader 4254 includes at least one loader carriage 4256 movable between a loader first position for receiving at least one plant cultivation tray 4110, and at least one loader second position spaced vertically apart from the loader first position for loading the at least one plant cultivation tray 4110 onto the conveyor assemblies 4104 from the frame upstream end 4102a. In some examples, the system 4100 may also include an automated tray extractor (like the extractor 264) and/or an automated tray transfer mechanism (like the mechanism 2280) at a frame downstream end 4102b of the frame 4102.

The invention claimed is:

1. A plant cultivation system, comprising:
   (a) a frame having a frame upstream end and a frame downstream end spaced horizontally apart from the frame upstream end;
   (b) a plurality of vertically stacked conveyor assemblies mounted to the frame, each conveyor assembly including at least one conveyor extending between the frame upstream end and the frame downstream end along a conveyor axis;
   (c) a plurality of plant cultivation trays supported on each conveyor for translation along a respective conveyor axis toward the frame downstream end, each plant cultivation tray including: a tray body having a tray top and a tray bottom vertically opposite the tray top; a plurality of plant cavities in the tray body and open to the tray top, the plant cavities for holding plants; and at least one tray vent passing vertically through the tray body, the tray vent open to the tray top and the tray bottom for passing air vertically through the tray body to facilitate delivery of air to the plants from below; and
   (d) an air delivery ductwork for delivering air to the plants, the air delivery ductwork including a plurality of first ports above each plant cultivation tray for discharging air from the air delivery ductwork downwardly to deliver air to the plants from above, and a plurality of second ports below each plant cultivation tray for discharging air from the air delivery ductwork upwardly to deliver air to the plants from below via the tray vents, wherein each conveyor includes a pair of supports spaced laterally apart from one another by a conveyor opening and extending between the frame upstream end and the frame downstream end along the conveyor axis, the supports engaging laterally spaced apart tray underside surfaces of the plant cultivation trays supported on the conveyor, and wherein the tray vents of the plant cultivation trays supported on the conveyor are laterally intermediate the pair of supports and overlying the conveyor opening.

2. The system of claim 1, wherein the tray vent extends between a vent top end open to the tray top and a vent bottom end open to the tray bottom, and wherein the vent bottom end overlies at least one of the second ports for receiving air discharged from the at least one of the second ports.

3. The system of claim 1, wherein each plant cultivation tray includes a nutrient chamber internal the tray body and in fluid communication with the plant cavities, the nutrient chamber for holding plant nutrient solution, and wherein the tray vent passes vertically through the nutrient chamber.

4. The system of claim 1, wherein the at least one tray vent includes at least one side tray vent adjacent a tray sidewall of the tray, the tray sidewall extending between the tray top and the tray bottom, the tray sidewall having a horizontally outwardly directed sidewall outer surface and at least one vent recess extending horizontally inward of the sidewall outer surface and open to the tray top and the tray bottom, and wherein the side tray vent comprises the vent recess.

5. The system of claim 1, wherein the air delivery ductwork includes a plurality of duct assemblies for conducting air to the first and second ports, the duct assemblies spaced vertically apart from one another, and the conveyor assemblies and the duct assemblies vertically interposed between one another.

6. The system of claim 5, wherein the air delivery ductwork includes a duct header in fluid communication with each duct assembly for conducting air thereto.

7. A plant cultivation system, comprising:
   (a) a frame having a frame upstream end and a frame downstream end spaced horizontally apart from the frame upstream end;
   (b) a plurality of vertically stacked conveyor assemblies mounted to the frame, each conveyor assembly including at least one conveyor extending between the frame upstream end and the frame downstream end along a conveyor axis;
   (c) a plurality of plant cultivation trays supported on each conveyor for translation along a respective conveyor axis toward the frame downstream end, each plant cultivation tray including: a tray body having a tray top and a tray bottom vertically opposite the tray top; a plurality of plant cavities in the tray body and open to the tray top, the plant cavities for holding plants; and at least one tray vent passing vertically through the tray body, the tray vent open to the tray top and the tray bottom for passing air vertically through the tray body;

(d) an air delivery ductwork for delivering air to the plants, the air delivery ductwork including a plurality of first ports above each plant cultivation tray for discharging air from the air delivery ductwork downwardly to deliver air to the plants from above, and a plurality of second ports below each plant cultivation tray for discharging air from the air delivery ductwork upwardly to deliver air to the plants from below via the tray vents;

(e) wherein each plant cultivation tray includes a nutrient chamber internal the tray body and in fluid communication with the plant cavities, the nutrient chamber for holding plant nutrient solution;

(f) wherein each conveyor includes a pair of supports spaced laterally apart from one another by a conveyor opening and extending between the frame upstream end and the frame downstream end along the conveyor axis, the supports engaging laterally spaced apart tray underside surfaces of the plant cultivation trays supported on the conveyor, and wherein the tray vents of the plant cultivation trays supported on the conveyor are laterally intermediate the pair of supports and overlie the conveyor opening.

8. The system of claim 7, wherein the tray body includes a nutrient chamber bottom wall and a nutrient chamber sidewall extending upwardly from a periphery of the nutrient chamber bottom wall, the nutrient chamber bottom wall and the nutrient chamber sidewall enclosing the nutrient chamber, and wherein the nutrient chamber bottom wall lies in a generally horizontal plane for maintaining a generally constant depth of the plant nutrient solution across the nutrient chamber bottom wall.

9. The system of claim 7, wherein the nutrient chamber is laterally intermediate the pair of supports.

10. The system of claim 9, wherein the nutrient chamber extends into the conveyor opening.

11. The system of claim 7, wherein the tray vent passes through the nutrient chamber.

12. A plant cultivation system, comprising:

(a) a frame having a frame upstream end and a frame downstream end spaced horizontally apart from the frame upstream end;

(b) a plurality of vertically stacked conveyor assemblies mounted to the frame, each conveyor assembly including at least one conveyor extending between the frame upstream end and the frame downstream end along a conveyor axis;

(c) a plurality of plant cultivation trays supported on each conveyor for translation along a respective conveyor axis toward the frame downstream end, each plant cultivation tray including: a tray body having a tray top and a tray bottom vertically opposite the tray top; a nutrient chamber internal the tray body for holding plant nutrient solution; a plurality of plant cavities in the tray body for holding plants, each plant cavity open to the tray top and in fluid communication with the nutrient chamber for providing the plant nutrient solution to the plants; at least one tray vent passing vertically through the tray body and the nutrient chamber, the tray vent open to the tray top and the tray bottom for passing air vertically through the tray body to facilitate delivery of air to the plants from below; and (d) an air delivery ductwork for delivering air to the plants, the air delivery ductwork including a plurality of duct assemblies extending below corresponding conveyor assemblies for discharging air from the air delivery ductwork upwardly through the tray vents to deliver air to the plants from below.

13. The system of claim 12, wherein the tray body includes a tray lower portion and a tray upper portion removably nested in the tray lower portion, and wherein the nutrient chamber is in the tray lower portion, the plant cavities are in the tray upper portion, and the tray vent passes through the tray lower portion and the tray upper portion.

14. The system of claim 12, wherein the tray body includes a nutrient chamber bottom wall and a nutrient chamber sidewall extending upwardly from a periphery of the nutrient chamber bottom wall, the nutrient chamber bottom wall and the nutrient chamber sidewall enclosing the nutrient chamber.

15. The system of claim 14, wherein the nutrient chamber bottom wall lies in a generally horizontal plane for maintaining a generally constant depth of the plant nutrient solution across the nutrient chamber bottom wall.

16. The system of claim 14, wherein the tray vent includes a vent projection extending upwardly from the nutrient chamber bottom wall and through the nutrient chamber, the vent projection having: a hollow interior in fluid isolation of the nutrient chamber, and a port above the nutrient chamber and providing fluid communication between the hollow interior and the tray top.

17. The system of claim 12, wherein each conveyor includes a pair of supports spaced laterally apart from one another by a conveyor opening and extending between the frame upstream end and the frame downstream end along the conveyor axis, and wherein each plant cultivation tray is supported by a corresponding pair of supports with the tray vent in alignment with the conveyor opening.

18. The system of claim 17, wherein each of the duct assemblies includes a plurality of ports generally in alignment with the tray vents for discharging air upwardly therethrough.

* * * * *